(12) United States Patent
Seguchi et al.

(10) Patent No.: US 12,103,104 B2
(45) Date of Patent: Oct. 1, 2024

(54) LASER MACHINE

(71) Applicant: Mitsubishi Electric Corporation, Tokyo (JP)

(72) Inventors: Masaki Seguchi, Tokyo (JP); Yoshiharu Kurosaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 115 days.

(21) Appl. No.: 18/014,171

(22) PCT Filed: Mar. 26, 2021

(86) PCT No.: PCT/JP2021/013022
§ 371 (c)(1),
(2) Date: Jan. 3, 2023

(87) PCT Pub. No.: WO2022/201528
PCT Pub. Date: Sep. 29, 2022

(65) Prior Publication Data
US 2023/0256538 A1 Aug. 17, 2023

(51) Int. Cl.
*B23K 26/16* (2006.01)
*B23K 26/12* (2014.01)
(Continued)

(52) U.S. Cl.
CPC .......... *B23K 26/127* (2013.01); *B23K 26/142* (2015.10); *B23K 26/706* (2015.10)

(58) Field of Classification Search
None
See application file for complete search history.

(56) References Cited

U.S. PATENT DOCUMENTS

| | | | |
|---|---|---|---|
| 5,556,324 A * | 9/1996 | Shank, Jr. | B24C 9/00 451/87 |
| 10,702,951 B2 * | 7/2020 | Ozeki | B30B 13/00 |

(Continued)

FOREIGN PATENT DOCUMENTS

| | | | |
|---|---|---|---|
| CN | 208696616 U * | 4/2019 | B23K 26/0093 |
| DE | 2326296 A * | 12/1974 | B23K 26/12 |

(Continued)

OTHER PUBLICATIONS

International Search Report and Written Opinion mailed on Jun. 8, 2021, received for PCT Application PCT/JP2021/013022, filed on Mar. 26, 2021, 8 pages including English Translation.

*Primary Examiner* — Joseph A Dillon, Jr.
(74) *Attorney, Agent, or Firm* — XSENSUS LLP

(57) ABSTRACT

A laser machine includes a housing, a machining table, a gate, a machining head, a loading/unloading door, an exhaust port, an outside air intake port, and a deflector. The housing includes a first face and a second face orthogonal to a first direction, a third face and a fourth face orthogonal to a second direction, and a fifth face orthogonal to a third direction and facing the floor surface. The exhaust port is provided on the second face and connected to an exhaust unit that generates an airflow that is a flow of air inside the housing. The outside air intake port is provided in an upper part of the housing between the first face and the machining head in the first direction, and takes in outside air. The deflector guides the outside air introduced through the outside air intake port toward the machining head.

13 Claims, 16 Drawing Sheets

(51) Int. Cl.
*B23K 26/142* (2014.01)
*B23K 26/70* (2014.01)

(56) References Cited

U.S. PATENT DOCUMENTS

| | | | |
|---|---|---|---|
| 11,161,212 B2* | 11/2021 | Speker | B08B 15/00 |
| 11,376,690 B2* | 7/2022 | Reisacher | B22F 3/24 |
| 11,724,336 B2* | 8/2023 | Sartin | B23K 26/1436 |
| | | | 219/440 |
| 2007/0284345 A1 | 12/2007 | Ando et al. | |
| 2016/0370786 A1* | 12/2016 | Nagaoka | G05B 19/23 |
| 2018/0178285 A1* | 6/2018 | Martin | B29C 64/268 |
| 2020/0246913 A1* | 8/2020 | Sartin | B23K 26/1464 |
| 2020/0298338 A1* | 9/2020 | Reisacher | B29C 64/357 |
| 2021/0362270 A1* | 11/2021 | Dajnowski | B23K 26/1224 |
| 2022/0040787 A1* | 2/2022 | Hirayama | B23K 26/0876 |

FOREIGN PATENT DOCUMENTS

| | | |
|---|---|---|
| EP | 0088021 B1 * | 2/1983 |
| JP | 2008-23548 A | 2/2008 |

* cited by examiner

LASER MACHINE

CROSS-REFERENCE TO RELATED APPLICATION

The present application is based on PCT filing PCT/JP2021/013022, filed Mar. 26, 2021, the entire contents of which are incorporated herein by reference.

FIELD

The present disclosure relates to a laser machine that radiates laser beam to machine a workpiece.

BACKGROUND

In relation to laser machines that machine a workpiece through laser light irradiation, techniques have been proposed for removing dust generated at the machining point on the workpiece irradiated with laser light. Patent Literature 1 discloses a laser cutting apparatus including: a movable stage having a workpiece placement region in which the workpiece to be cut is placed; a laser oscillator facing the workpiece placement region and having a laser emission surface that emits laser light; a cover member that covers a laser irradiation space between the laser emission surface and the workpiece placement region; and a dust collecting pump. The cover member of the laser cutting apparatus described in Patent Literature 1 includes an intake port and an exhaust port. The intake port is provided on a side surface of the cover member at a position closer to the workpiece placement region than to the laser emission surface. The exhaust port is provided on the opposite side surface across the workpiece placement region at a position closer to the workpiece placement region than to the laser emission surface, and is connected to the dust collecting pump. Operating the dust collecting pump during the machining of the workpiece causes air to flow into the laser irradiation space inside the cover member from the intake port, so as to form an exhaust flow for horizontally discharging dust generated at the machining point on the surface side of the workpiece in the workpiece placement region. Consequently, dust is prevented from adhering to the surface of the workpiece.

CITATION LIST

Patent Literature

Patent Literature 1: Japanese Patent Application Laid-open No. 2008-23548

SUMMARY

Technical Problem

However, the laser cutting apparatus described in Patent Literature 1 is designed to machine a plate-shaped workpiece, such as a semiconductor device, having a thickness sufficiently smaller than its horizontal size. Therefore, when the workpiece does not have a plate shape but a three-dimensional shape with protrusions and recesses, it is difficult to install a large cover member that covers the machining position without interfering with the workpiece. In addition, installing the intake port and the exhaust port in the cover member near the workpiece results in an increase in the size of the machining head including the cover member, making it difficult to bring the machining head close to the workpiece with protrusions and recesses. A possible measure to avoid this sort of problem is to cover the entire machining table with a cover member and discharge air from inside the entire cover member. In such a cover member, forming a horizontal exhaust flow at the machining point close to the machining table as described in Patent Literature 1 is problematic in the case of a workpiece with a three-dimensional shape in that the exhaust flow is disturbed and does not reach the machining point, and dust generated at the machining point cannot be discharged.

The present disclosure has been made in view of the above, and an object thereof is to provide a laser machine capable of forming an exhaust flow that stably discharges dust generated at the machining point when machining a three-dimensional workpiece with protrusions and recesses through laser light irradiation.

Solution to Problem

In order to solve the above-described problems and achieve the object, a laser machine according to the present disclosure includes: a housing; a machining table; a gate; a machining head; a loading/unloading door; an exhaust port; an outside air intake port; and a deflector. Three directions orthogonal to each other are defined as a first direction, a second direction, and a third direction. The housing is disposed on a floor surface in a room, and includes: a first face and a second face orthogonal to the first direction; a third face and a fourth face orthogonal to the second direction; and a fifth face orthogonal to the third direction and facing the floor surface. The machining table is disposed inside the housing, and includes a table surface on which a workpiece is placed and that is parallel to the floor surface. The gate includes: a pillar provided on at least one of opposite sides of the machining table in the second direction; and a beam connected to the pillar and extending in the second direction above the machining table. The machining head is supported by the beam and emits laser light. The loading/unloading door is a door that is openable and closable provided on the first face for use in loading/unloading the workpiece. The exhaust port is provided on the second face and connected to an exhaust unit that generates an airflow that is a flow of air inside the housing. The outside air intake port is provided in an upper part of the housing between the first face and the machining head in the first direction, and takes in outside air that is air outside the housing. The deflector guides the outside air introduced through the outside air intake port toward the machining head. The machining head is present between the second face and the outside air intake port at all positions in a range of movement.

Advantageous Effects of Invention

The laser machine according to the present disclosure can achieve the effect of forming an exhaust flow that stably discharges dust generated at the machining point when machining a three-dimensional workpiece with protrusions and recesses through laser light irradiation.

DESCRIPTION OF EMBODIMENTS

Hereinafter, a laser machine according to embodiments of the present disclosure will be described in detail based on the drawings.

First Embodiment

Figure 1:
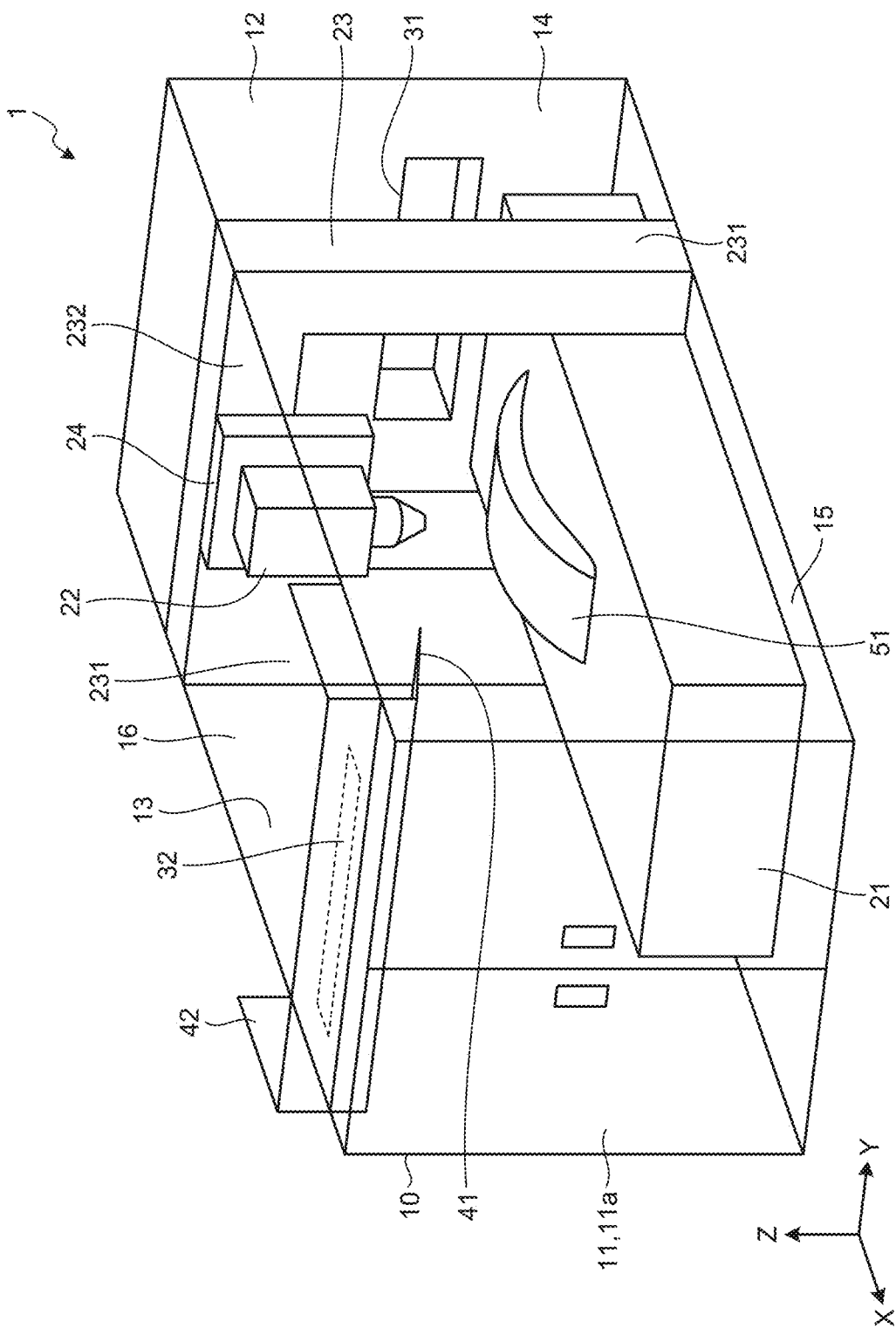
FIG. 1 is a perspective view illustrating an exemplary configuration of a laser machine according to a first embodiment.

FIG. 1 is a perspective view illustrating an exemplary configuration of a laser machine according to the first embodiment. In FIG. 1, two axes orthogonal to each other on a horizontal plane are defined as the X axis and the Y axis, and an axis perpendicular to both the X axis and the Y axis is defined as the Z axis. Hereinafter, two relative positions in the X-axis direction are expressed by using front and rear, two relative positions in the Y-axis direction are expressed by using left and right, and two relative positions in the Z-axis direction are expressed by using upper and lower. The X-axis direction corresponds to the first direction, the Y-axis direction corresponds to the second direction, and the Z-axis direction corresponds to the third direction.

The laser machine 1 includes a housing 10. The housing 10 has a hollow shape including six faces: a front face 11 and a rear face 12 orthogonal to the X-axis direction, a left face 13 and a right face 14 orthogonal to the Y-axis direction, and a lower face 15 and an upper face 16 orthogonal to the Z-axis direction. In one example, the housing 10 has a hollow hexahedral shape. Hereinafter, a case where the housing 10 has a hollow rectangular parallelepiped shape extending in the X-axis direction relative to the Y-axis direction will be described as an example. The front face 11 corresponds to the first face, the rear face 12 corresponds to the second face, the left face 13 corresponds to the third face, the right face 14 corresponds to the fourth face, and the upper face 16 corresponds to the fifth face. The front face 11 is an openable and closable loading/unloading door 11a for use in loading or unloading a workpiece 51. In FIG. 1, the front face 11 is the loading/unloading door 11a in its entirety, but the front face 11 may be partially configured by the loading/unloading door 11a.

The laser machine 1 described in the first embodiment is designed to machine the workpiece 51 with a length of up to several meters, for example. Therefore, an example range of the length of a machining table 21 is approximately one to seven meters.

The laser machine 1 includes the machining table 21, a machining head 22, and a gate 23 inside the housing 10. The machining table 21 is disposed on the lower face 15 inside the housing 10, and includes a table surface on which the workpiece 51 to be subjected to laser machining is placed and that is parallel to the lower face 15. Here, similarly to the housing 10, the machining table 21 has a shape which is longer in the X-axis direction than in the Y-axis direction. The machining table 21 is movable in the X-axis direction, which is the longitudinal direction. That is, a drive system (not illustrated) that moves the machining table 21 in the X-axis direction is provided. The workpiece 51 is loaded onto the machining table 21 in the housing 10 through the loading/unloading door 11a disposed on the front face 11 of the housing 10.

The machining head 22 performs irradiation by focusing laser light transmitted from a laser oscillator (not illustrated) onto the machining point at which the workpiece 51 is machined. The machining head 22 machines the workpiece 51 into a desired shape by changing the relative position with respect to the workpiece 51.

When a $CO_2$ laser is used as the laser oscillator, transmission of the laser light from the laser oscillator to the machining head 22 is generally performed by a plurality of mirrors. Alternatively, an optical fiber for optical transmission is generally used, when a fiber laser, a disk laser, a direct diode laser, or the like oscillating at a wavelength capable of being transmitted by an optical fiber are used as the laser oscillator.

The gate 23 is disposed straddling the machining table 21. The gate 23 includes a pair of pillars 231 extending in a direction perpendicular to the lower face 15, and a beam 232 connecting the end parts of the pair of pillars 231 near the upper face 16. The beam 232 extends in the Y-axis direction above the machining table 21. The beam 232 is equipped with the machining head 22. The machining head 22 is connected to the beam 232 via a support member 24. In one example, the support member 24 movably supports the machining head 22 in the Z-axis direction and the Y-axis direction. That is, the support member 24 is equipped with a drive system (not illustrated) that moves the machining head 22 in the Z-axis direction and the Y-axis direction.

The laser machine 1 includes an exhaust port 31 and an outside air intake port 32 in the housing 10. The exhaust port 31 is provided on the rear face 12 of the housing 10 and is coupled to an exhaust unit (not illustrated). In one example, the exhaust port 31 is provided at substantially the same position as the upper face of the machining table 21 in the Z-axis direction. The exhaust unit generates an airflow that is a flow of air inside the housing 10. The outside air intake port 32 is provided in an upper part of the housing 10 between the front face 11 and the machining head 22 in the X-axis direction. That is, the machining head 22 is present between the rear face 12 and the outside air intake port 32 at all positions in the range of movement of the machining head 22. In the example of FIG. 1, the outside air intake port 32 is provided at the end part of the upper face 16 of the housing 10 near the loading/unloading door 11a, and takes outside air that is gas outside the housing 10 into the housing 10. An example of the gas is air.

The laser machine 1 includes a deflector 41 and a light shielding plate 42. The deflector 41 guides the outside air taken into the housing 10 toward the machining head 22. The light shielding plate 42 is provided in the vicinity of the outside air intake port 32 outside the housing 10 and surrounds the outside air intake port 32 so that: scattered light of laser light from the machining head 22 does not leak from the outside air intake port 32; or scattered light of laser light leaking from the outside air intake port 32 is sufficiently attenuated. In one example, the light shielding plate 42 is a plate-shaped member which is disposed along the front face 11, the left face 13, and the right face 14 around the rectangular outside air intake port 32 and stands perpendicularly or substantially perpendicularly to the upper face 16 of the housing 10.

In the case of the first embodiment, the relative position between the machining head 22 and the workpiece 51 is changed as follows. In the front-rear direction, the relative position between the workpiece 51 placed on the machining table 21 and the machining head 22 that emits laser light can be changed by moving or extending the machining table 21 that supports the workpiece 51. In order to change the incident angle of laser light with respect to the workpiece 51, the support member 24 that fixes the machining head 22 may include one or more rotation mechanisms for rotating the machining head 22.

When the workpiece 51 is machined through irradiation with laser light, reflected light or scattered light of laser light, or machining light from the machined substance or from plasma or the like of machining gas is emitted from the machining point. In addition, dust or the like including a material constituting the workpiece 51, a melt or an oxide of the material, or the like is generated from the workpiece 51 and floats in the air. In particular, in a case where the workpiece 51 is carbon fiber reinforced plastics (CFRP) or the like, the dust contains conductive fibers such as carbon fibers. If such floating fine conductive fibers adhere onto an electric substrate in the control device, power supply device (not illustrated), or the like of the laser machine 1, a short circuit occurs in a circuit on the electric substrate, which may cause malfunction or damage of the laser machine 1. Therefore, it is particularly required that machining light or floating dust is not let out of the laser machine 1. Therefore, in the first embodiment, the machining table 21 including the machining point, the machining head 22, the gate 23, and the like are disposed so as to be entirely covered inside the housing 10 serving as a cover.

If the loading/unloading door 11a is opened while generated dust is floating inside the housing 10, dust may leak out of the housing 10. In order to collect dust generated during machining, it is required to form a unidirectional exhaust flow that passes through the machining point to the exhaust port 31. For example, if the outside air intake port 32 is installed on the upper face 16 immediately above the machining point, the flow does not go unidirectionally through the machining point, but spreads in the housing 10 while forming a stagnation zone around the machining point. In such a configuration, dust is diffused in the housing 10 and deposited on the lower face 15 in the housing 10. In this case, dust may be stirred up as the workpiece 51 is placed on or removed from the machining table 21.

Figure 2:
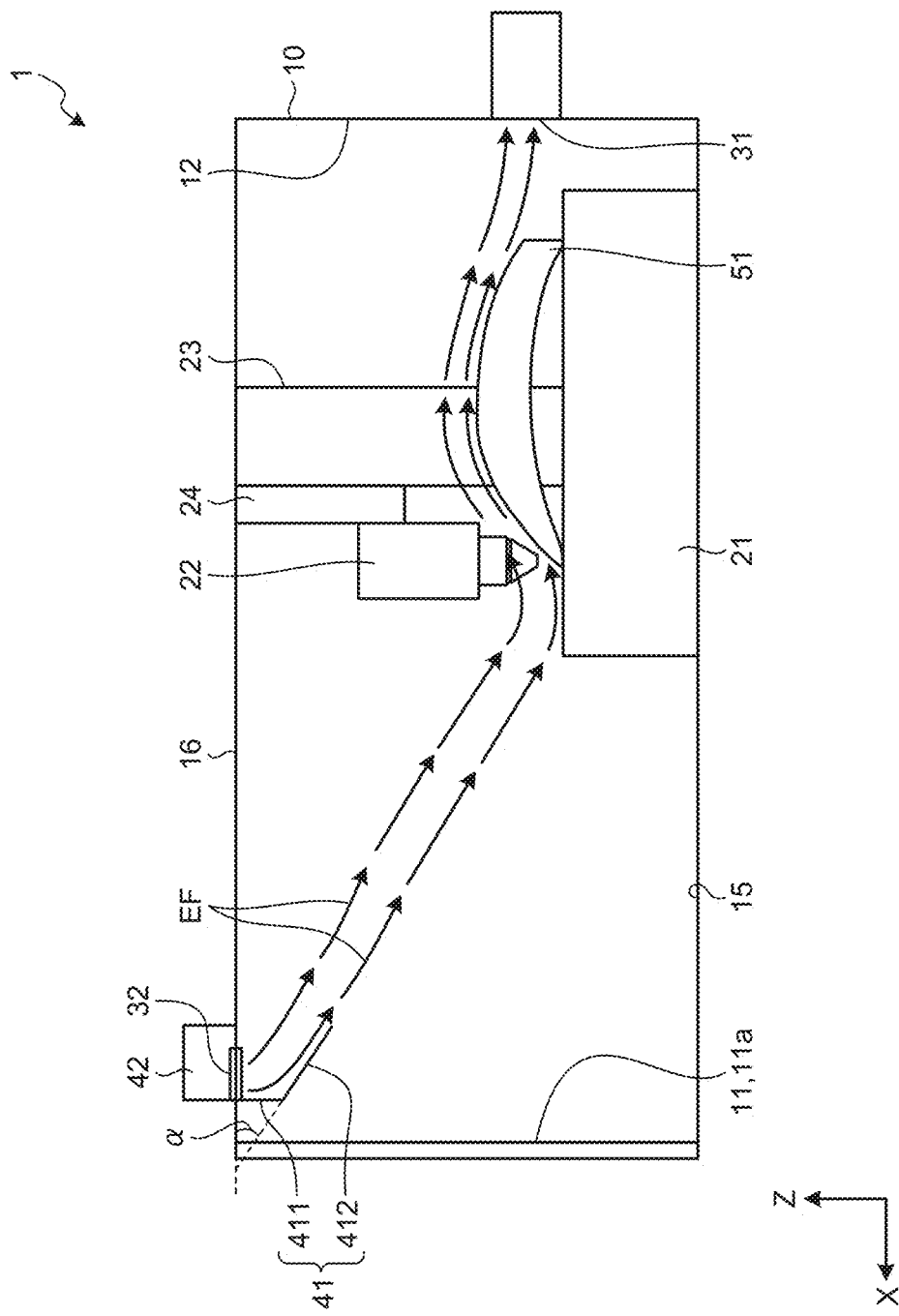
FIG. 2 is a cross-sectional view illustrating an example of exhaust flow in the housing of the laser machine according to the first embodiment.

FIG. 2 is a cross-sectional view illustrating an example of exhaust flow in the housing of the laser machine according to the first embodiment. According to the configuration of the first embodiment, in the housing 10, the outside air taken in from the outside air intake port 32 on the upper face 16 near the loading/unloading door 11a forms an exhaust flow EF, i.e. a flow that passes through the machining point in one direction to the exhaust port 31 and is a downflow from the upper face 16 to the machining point. Specifically, suction is performed on the rear face 12, which is the surface facing the loading/unloading door 11a, toward the exhaust port 31 coupled to the exhaust unit, and the outside air intake port 32 is installed on the upper face 16 in the vicinity of the loading/unloading door 11a between the loading/unloading door 11a and the machining point.

Because the outside air intake port 32 is installed on the upper face 16 of the housing 10, even if reflected light or scattered light of laser light on the workpiece 51 or machining light generated at the machining point leaks from the outside air intake port 32, the reflected light, scattered light, or machining light reaches an operator outside the housing 10 via the ceiling of the room where the housing 10 is installed. That is, reflected light, scattered light, or machining light is scattered and sufficiently attenuated before reaching the position of the operator from inside the housing 10 through the outside air intake port 32. In addition, with the simple configuration in which the light shielding plate 42 is provided around the outside air intake port 32 outside the housing 10, reflected light, scattered light, or machining light is attenuated by reflection and scattering at the light shielding plate 42. That is, reflected light, scattered light, or machining light can be substantially confined in the housing 10, and a safe environment can be provided for the operator working outside the housing 10. Note that if reflection and scattering of reflected light, scattered light, or machining light can be sufficiently attenuated through the propagation from the machining point to the outside air intake port 32, the light shielding plate 42 may not necessarily be provided.

As described above, in the first embodiment, the outside air intake port 32 for achieving both intake of outside air and light shielding in the laser machine 1 can be configured with a simple shape.

As illustrated in FIG. 2, as air inside the housing 10 is discharged through the exhaust port 31 by the exhaust unit (not illustrated), outside air is taken into the housing 10 from the outside air intake port 32. The flow direction of the outside air taken in from the outside air intake port 32 is bent by the inclination of the deflector 41 provided on the upper face 16 inside the housing 10. That is, the outside air flows in the direction toward the machining point on the workpiece 51 at the tip of the machining head 22. The outside air flows in one direction with respect to the machining point, and dust generated at the machining point can be discharged to the exhaust port 31 disposed at the rear. Furthermore, because the outside air intake port 32 is thus installed in the vicinity of the loading/unloading door 11a on the upper face 16, the exhaust flow EF can be supplied to the machining point in a downflow. Consequently, even when the workpiece 51 has a three-dimensional shape, the exhaust flow EF is not blocked by the shape of the part of the workpiece 51 between the loading/unloading door 11a and the machining head 22, and dust generated at the machining point can be discharged and collected.

In one example, the deflector 41 includes a first portion 411 having a flat plate shape extending from the upper face 16 toward the lower face 15, and a second portion 412 having a flat plate shape extending from the end part of the first portion 411 facing the lower face 15 toward the machining head 22. The deflector 41 may be configured by one plate or may partially include a curved surface. The angle α between the inclined surface of the second portion 412 of the deflector 41 and the upper face 16 of the housing 10 is set in the range of 25 to 50 degrees, for example, depending on the positional relationship between the position of the deflector 41 and the machining region. In addition, the deflector 41 may be configured by a part of the inner surface of the housing 10 including the upper face 16. The width of the deflector 41 in the Y-axis direction only needs to be larger than the width of the outside air intake port 32 in the Y-axis direction. The width of the deflector 41 in the Y-axis direction is preferably about 10% larger than the width of the outside air intake port 32 in the Y-axis direction. In addition, the deflector 41 may extend from the left face 13 to the right face 14 of the housing 10. The length of the deflector 41 in the X-axis direction only needs to be larger than the length of the outside air intake port 32 in the X-axis direction so that the outside air introduced into the housing 10 from the outside air intake port 32 spreads in the housing 10 and thereafter reaches the deflector 41. In other words, a projection of the deflector 41 on the upper face 16 includes the outside air intake port 32. In one example, the length of the deflector 41 in the X-axis direction can be about several times the length of the outside air intake port 32 in the X-axis direction. Note that as the length of the deflector 41 in the X-axis direction increases, the distance along the flow increases, and accordingly the controllability of directing the flow toward the machining point is improved.

Although FIG. 1 illustrates a case where the shape of the housing 10 is a rectangular parallelepiped, the shape of the housing 10 in the first embodiment is not limited to a rectangular parallelepiped. The housing 10 can have any substantially hexahedral structure as long as the effect of the first embodiment can be achieved, that is, as long as dust can be effectively discharged and collected. For example, the corners of the housing 10 may be chamfered, and the corners of the housing 10 may be formed by curved surfaces. A protrusion or a curved surface may be provided on the front face 11, the rear face 12, the left face 13, the right face 14, or the upper face 16 of the housing 10.

Figure 3:
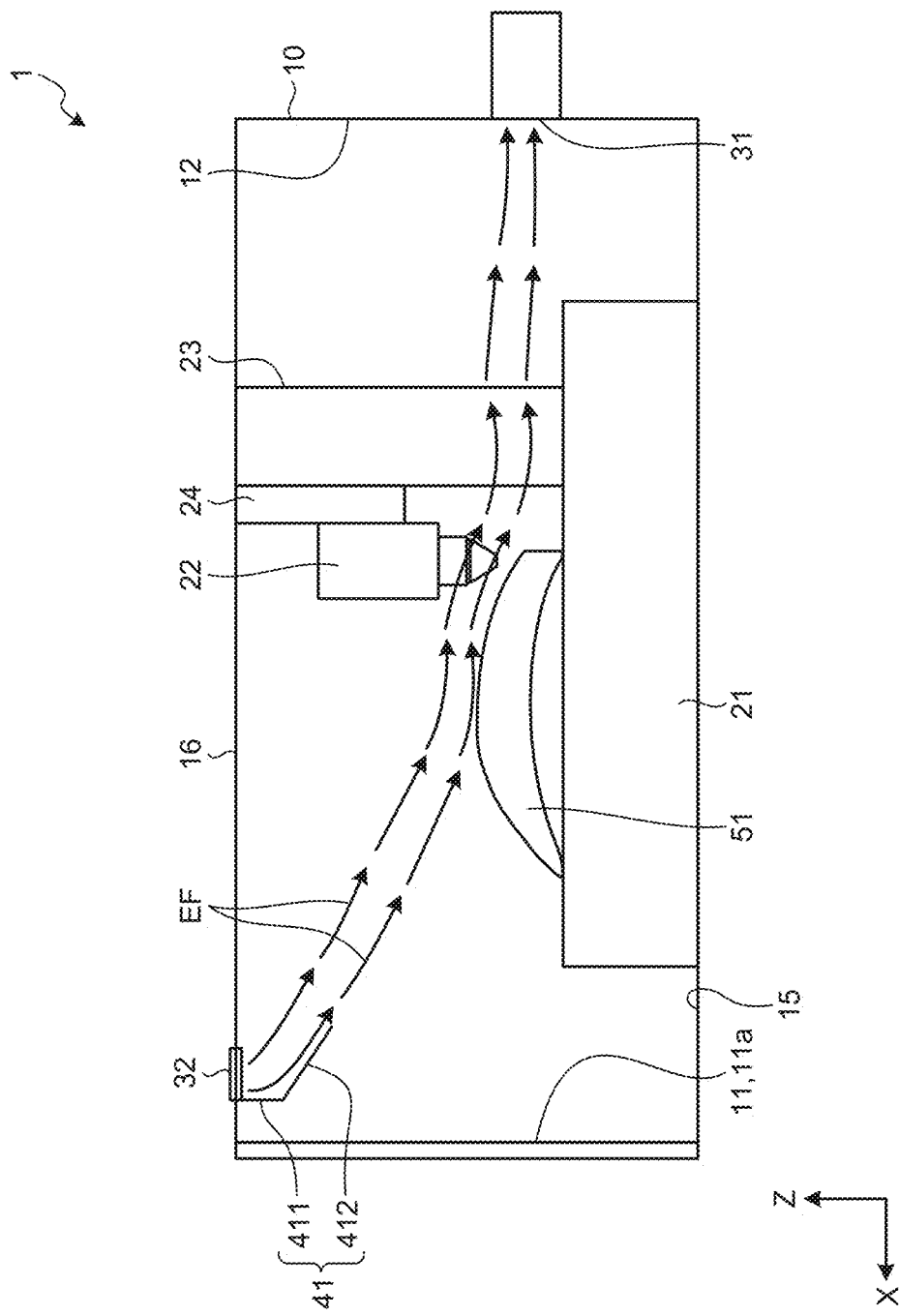
FIG. 3 is a cross-sectional view illustrating another example of exhaust flow in the housing of the laser machine according to the first embodiment.

Next, the position of the outside air intake port 32 provided on the upper face 16 will be described. If the outside air intake port 32 is installed at a position relatively far from the machining point and close to the loading/unloading door 11a, the exhaust flow EF in the vicinity of the machining point is a downflow that is nearly horizontal. FIG. 3 is a cross-sectional view illustrating another example of exhaust flow in the housing of the laser machine according to the first embodiment. In FIG. 3, the position of the machining table 21 is different from that in the case of FIG. 2. FIG. 3 illustrates the laser machine 1 without the light shielding plate 42. As illustrated in FIG. 3, despite the movement of the machining position on the workpiece 51, the exhaust flow EF in the vicinity of the machining point is a downflow that is nearly horizontal. In this manner, the flow can be directed to the exhaust port 31 in one direction with respect to the entire machining table 21.

On the other hand, if the outside air intake port 32 is installed relatively close to the machining point and far from the loading/unloading door 11a, the angle α formed by the inclined surface of the second portion 412 of the deflector 41 and the upper face 16 is set to be large, for example, 70 degrees or more. As a result, the exhaust flow EF in the vicinity of the machining point is a downflow having a larger inclination with respect to the machining point. In this case, depending on the surface shape of the workpiece 51, a large stagnation zone can be formed on the surface of the workpiece 51, and a part of the flow may go toward the loading/unloading door 11a opposite the exhaust port 31 disposed at the rear, resulting in dust or the like generated at the machining point being partially diffused and deposited in the housing 10. Therefore, with respect to the workpiece 51, it is required that the exhaust flow EF is not a downflow having a large inclination.

Figure 4:
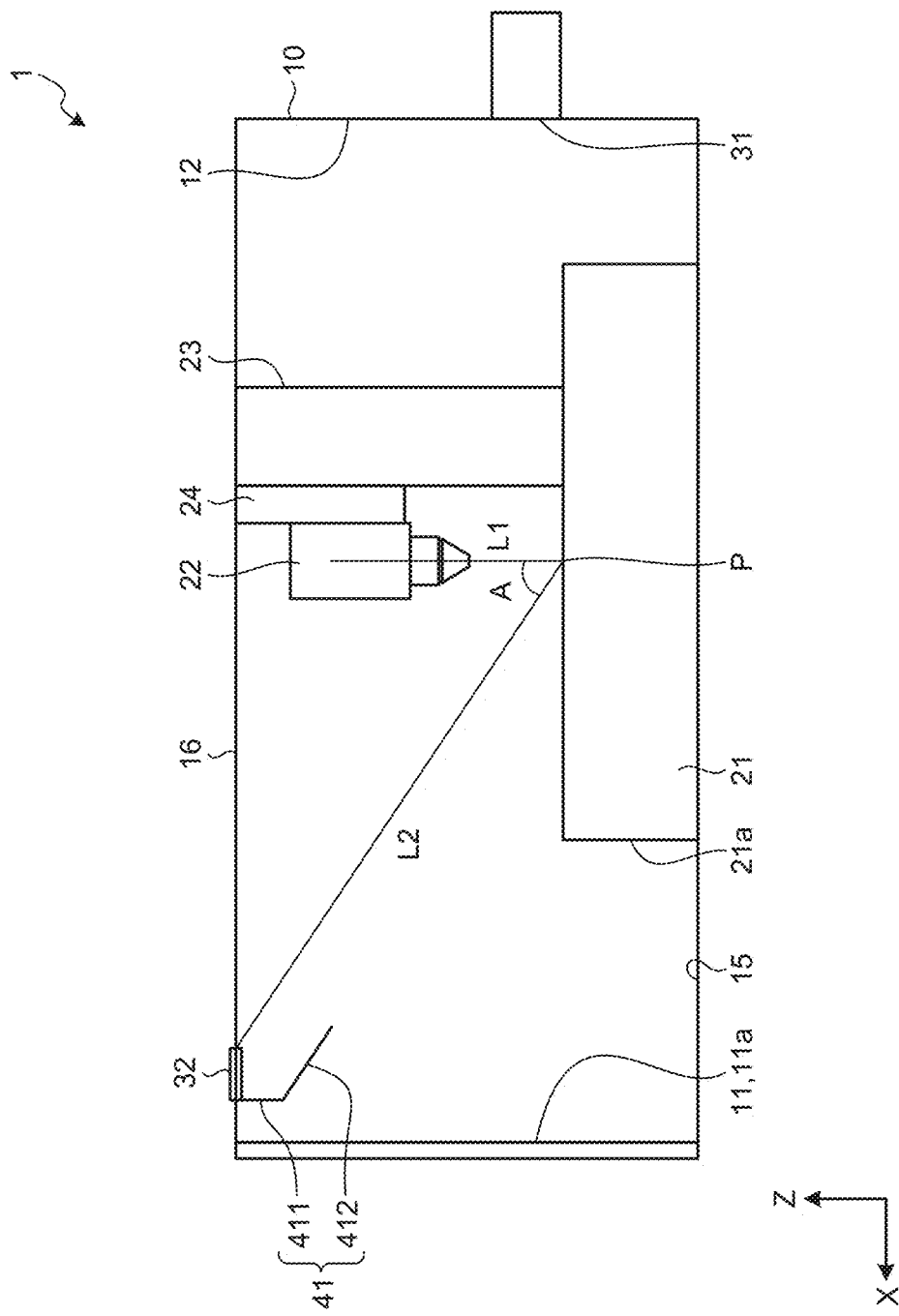
FIG. 4 is a cross-sectional view illustrating an example of the location of the outside air intake port in the laser machine according to the first embodiment.

The result of the numerical fluid analysis on the influence of the position of the outside air intake port 32 will be described. FIG. 4 is a cross-sectional view illustrating an example of the location of the outside air intake port in the laser machine according to the first embodiment. As illustrated in FIG. 4, the position of the outside air intake port 32 is preferably disposed closer to the loading/unloading door 11a than to the machining head 22, and between the loading/unloading door 11a and an end surface 21a of the machining table 21 facing the loading/unloading door 11a. In addition, the position of the outside air intake port 32 is preferably on the upper face 16 near the loading/unloading door 11a where the angle A formed by the straight line L1 drawn from the machining head 22 to the machining table 21 and the straight line L2 connecting the point P where the straight line L1 intersects the surface of the machining table 21 with the outside air intake port 32 is 30 degrees or more. Furthermore, by setting the position of the outside air intake port 32 to a position where the angle A is 40 degrees or more, the angle formed by the inclination of the exhaust flow EF with respect to the machining point and the upper face 16 can be controlled to 50 degrees or less. As a result, it can be seen that a unidirectional flow toward the exhaust port 31 can be formed with respect to the entire machining table 21 inside the housing 10 without forming a large stagnation zone on the surface of the workpiece 51.

Figure 5:
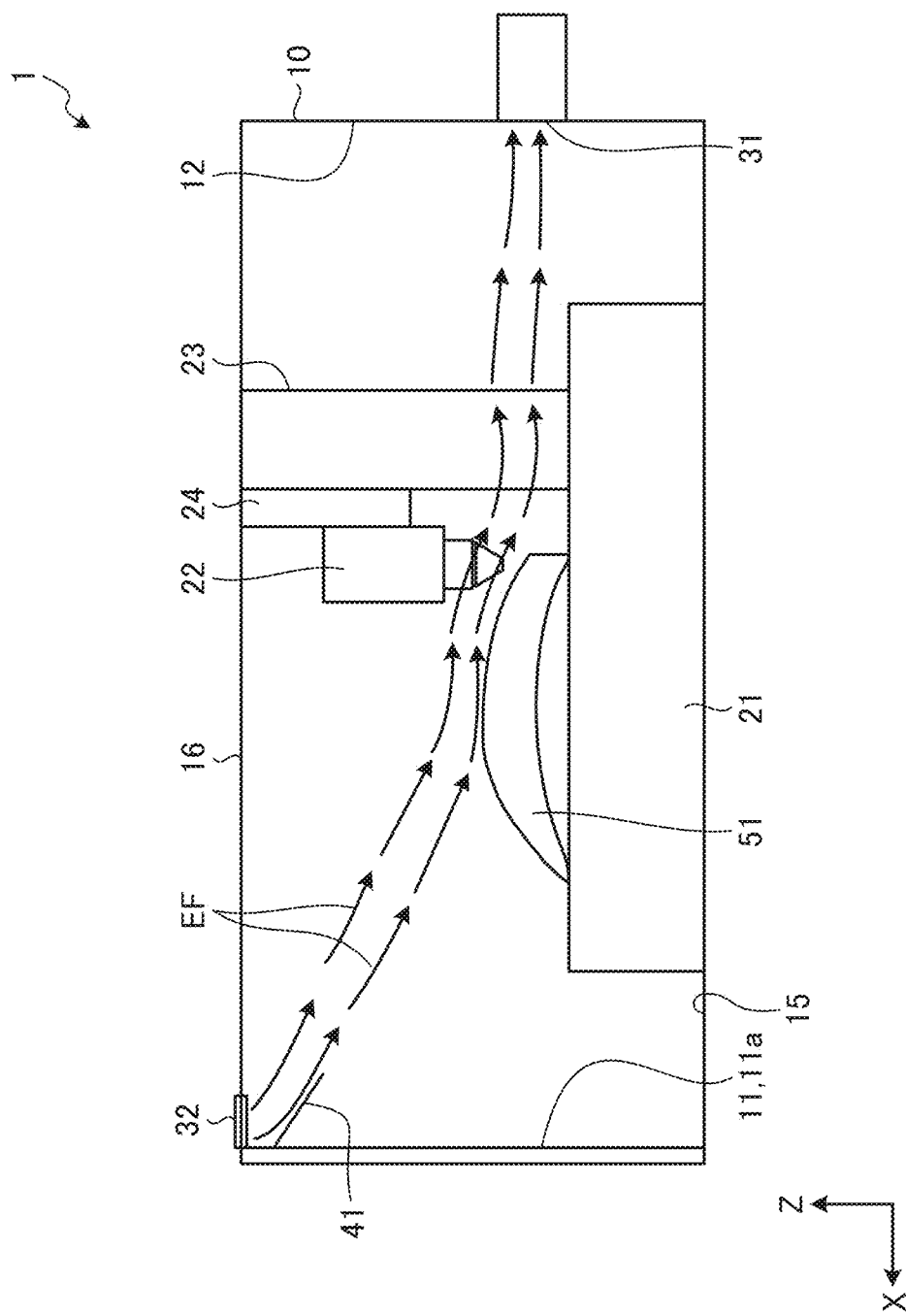
FIG. 5 is a cross-sectional view illustrating another exemplary configuration of the laser machine according to the first embodiment.

FIG. 5 is a cross-sectional view illustrating another exemplary configuration of the laser machine according to the first embodiment. In the laser machine 1 illustrated in FIG. 5, the position of the outside air intake port 32 is different from that in FIGS. 1 and 2. In FIGS. 1 and 2, the outside air intake port 32 is installed on the upper face 16 in the vicinity of the loading/unloading door 11a, whereas the outside air intake port 32 in FIG. 5 is installed at a position in contact with the ridge line of the front face 11 and the upper face 16 of the housing 10. This position of the outside air intake port 32 is also effective in forming the unidirectional exhaust flow EF from the machining point toward the exhaust port 31. Note that the other configurations are the same as those in FIGS. 1 and 2, and thus the description thereof will be omitted.

Figure 6:
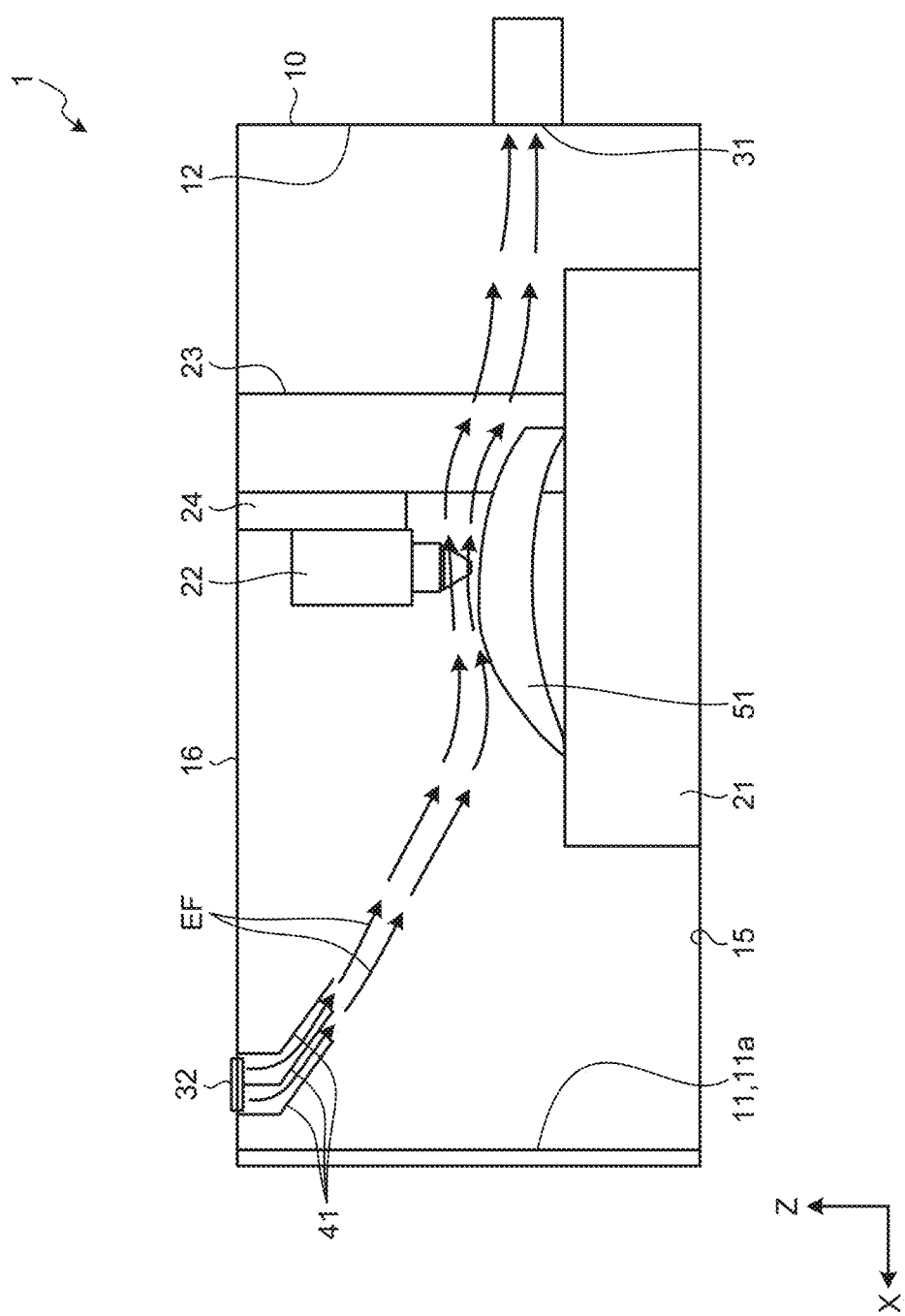
FIG. 6 is a cross-sectional view illustrating another exemplary configuration of the laser machine according to the first embodiment.

In the above-described case, the deflector 41 is configured by one member, but the deflector 41 may be configured by a plurality of members. In this case, the plurality of members are arranged parallel to each other in the X-axis direction in a region including the outside air intake port 32 of the upper face 16 inside the housing 10. FIG. 6 is a cross-sectional view illustrating another exemplary configuration of the laser machine according to the first embodiment. In FIG. 6, the deflector 41 is configured by three members. The deflector 41 includes a pair of members provided at intervals in the X-axis direction along the sides of the outside air intake port 32 in the Y-axis direction, and one member provided near the central part of the outside air intake port 32 between the pair of members. Thus, parallel flow paths are formed by the three members. The other configurations are the same as those in FIGS. 1 and 2, and thus the description thereof will be omitted. In this case, the directivity of the exhaust flow EF can be enhanced as compared with the case of FIGS. 1 and 2, and thus the flow can be more accurately guided in the direction toward the machining point. Although FIG. 6 illustrates the case where the deflector 41 includes two parallel flow paths, the deflector 41 may include three or more parallel flow paths.

Note that in the above-described cases, the deflector 41 is provided inside the housing 10, but the deflector 41 may be provided on the outside air intake port 32 outside the housing 10. In this case, the deflector 41 is installed outside the outside air intake port 32 at an angle of 25 to 50 degrees with respect to the upper face 16 of the housing 10. This also achieves a similar effect. For example, the deflector 41 in this case may be configured by one or more members as in the cases of FIGS. 1, 2, and 6, or may be a pipe connected to the outside air intake port 32 of the housing 10. In the case of pipe connection, the structure can be designed such that the outside air to be introduced into the housing 10 is blown into the housing 10 after passing through the pipe. Alternatively, a flow path having a desired inclination may be formed on a member of the upper face 16.

The laser machine 1 according to the first embodiment includes: the hexahedral housing 10 having the front face 11, the rear face 12, the left face 13, the right face 14, the lower face 15, and the upper face 16; the machining table 21 disposed in the housing 10; and the gate 23 disposed straddling the machining table 21 in the housing 10 and movably supporting the machining head 22. The front face 11 of the housing 10 serves as the loading/unloading door 11a. The housing 10 includes the outside air intake port 32 on the upper face 16 near the loading/unloading door 11a, and includes the exhaust port 31 connected to the exhaust unit on the rear face 12 facing the front face 11. The laser machine 1 includes the deflector 41 that guides outside air toward the machining point on the upper face 16 in the vicinity of the outside air intake port 32 inside the housing 10. The entire range of movement of the machining head 22 is present between the rear face 12 and the outside air intake port 32. Such a configuration allows outside air to be supplied from the outside air intake port 32 obliquely above the machining point, so that the outside air can be supplied to the machining point without being shielded by the workpiece 51. That is, it is possible to form the exhaust flow EF that stably discharges dust generated at the machining point when machining the three-dimensional workpiece 51 with protrusions and recesses through laser light irradiation.

Regarding the laser cutting apparatus described in Patent Literature 1, the installation of the intake port on one surface of the cover member requires measures to prevent the exhaust flow inside the cover member from being disturbed and to prevent scattered light of laser light from leaking. For this reason, the hood for shielding light installed on the intake port has a complicated shape, and a large space is required for installing the hood.

On the other hand, in the first embodiment, reflected light, scattered light, or machining light could go out from the outside air intake port 32, but is scattered by the ceiling in the room where the housing 10 is provided and then reaches an operator outside the housing 10. However, the reflected light, scattered light, or machining light is sufficiently attenuated by the time it reaches the operator. Therefore, it is possible to deal with the leakage of reflected light, scattered light, or machining light without forming a complicated shape having a light shielding function and for taking in outside air on the outside air intake port 32 in the housing 10. In addition, because the housing 10 does not have a complicated shape for light shielding, the loading/unloading door 11a for loading/unloading the large-sized workpiece 51 into/from the machining region can be provided on the housing 10.

In addition, in the laser cutting apparatus described in Patent Literature 1, in order for the air intake port to be installed in the cover member in the lateral direction with respect to the machining table having a rectangular shape in the horizontal direction, the air intake port needs to be long along the longitudinal direction of the machining table. In the laser cutting apparatus described in Patent Literature 1, a much wider space is required for the intake port.

On the other hand, in the first embodiment, the outside air intake port 32 is provided on the upper face 16 of the rectangular parallelepiped housing 10 so that the exhaust flow EF goes along the longitudinal direction inside the housing 10. Therefore, unlike in the laser cutting apparatus described in Patent Literature 1, dust generated through laser machining can be discharged without the need for a much wider space for the outside air intake port 32. Even though the gate 23 is provided, outside air is introduced from the upper face 16 of the housing 10, and thus the gate 23 does not interfere with the exhaust flow EF. Furthermore, because the gate 23 is installed in the direction across the lateral direction of the machining table 21, it is possible to reduce the size as compared with the case where the gate 23 is installed in the direction across the longitudinal direction.

Second Embodiment

In the first embodiment, the workpiece 51 on the machining table 21 is moved with respect to the machining head 22 by moving or extending the machining table 21 in the X-axis direction. The second embodiment describes a case where the gate 23 supporting the machining head 22 is moved.

Figure 7:
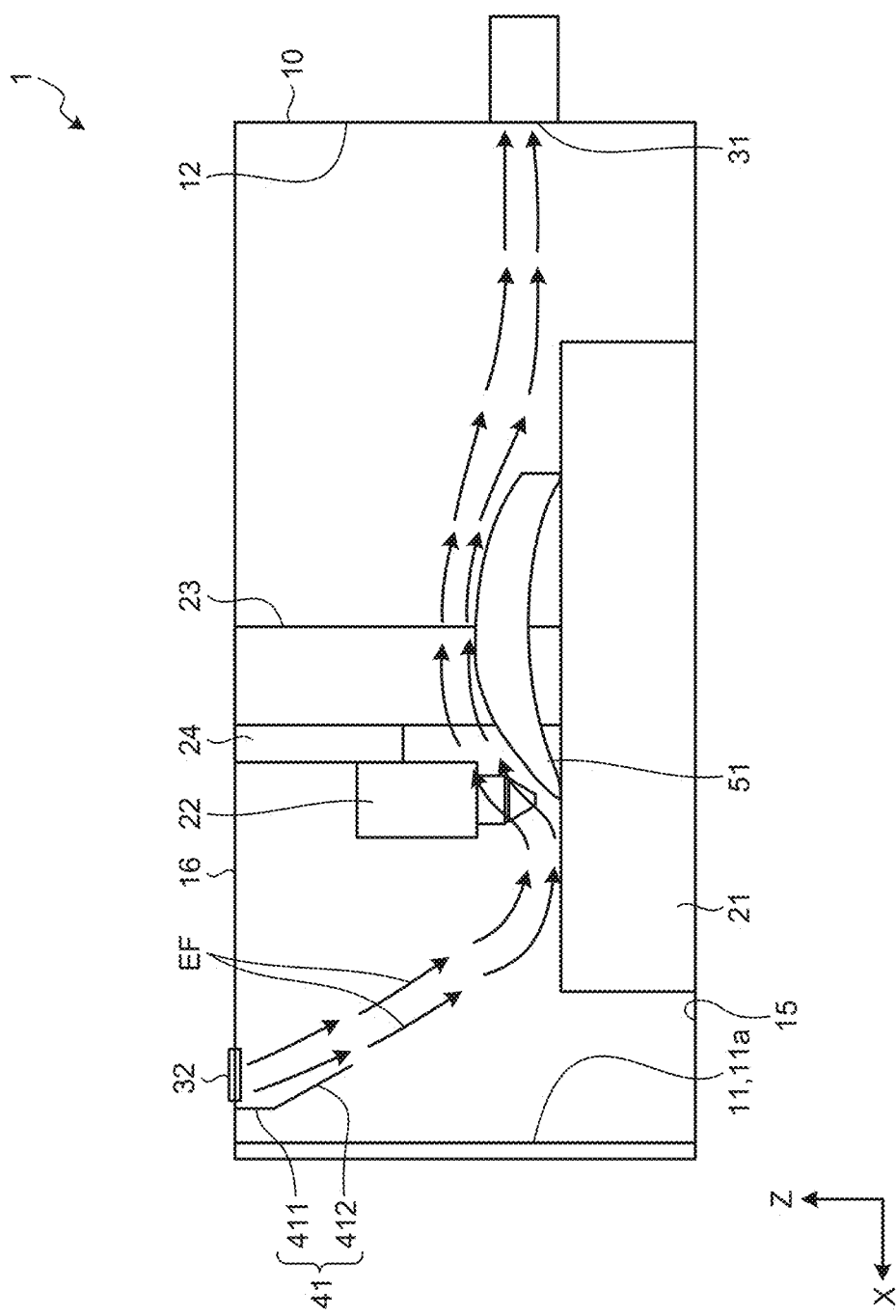
FIG. 7 is a cross-sectional view illustrating an exemplary configuration of a laser machine according to a second embodiment.

FIG. 7 is a cross-sectional view illustrating an exemplary configuration of the laser machine according to the second embodiment. Note that components identical to those in the first embodiment are denoted by the same reference signs, and the description thereof will be omitted. The second embodiment shows a case where the light shielding plate 42 is not provided. In the laser machine 1 according to the second embodiment, the gate 23 is movable in the X-axis direction. That is, the gate 23 is equipped with a drive system (not illustrated), and the gate 23 is moved in the X-axis direction by the drive system. As illustrated in FIG. 7, outside air coming from the outside air intake port 32 forms the unidirectional exhaust flow EF that hits the machining table 21 at a predetermined position and thereafter goes to the exhaust port 31 along the surface of the workpiece 51.

Figure 8:
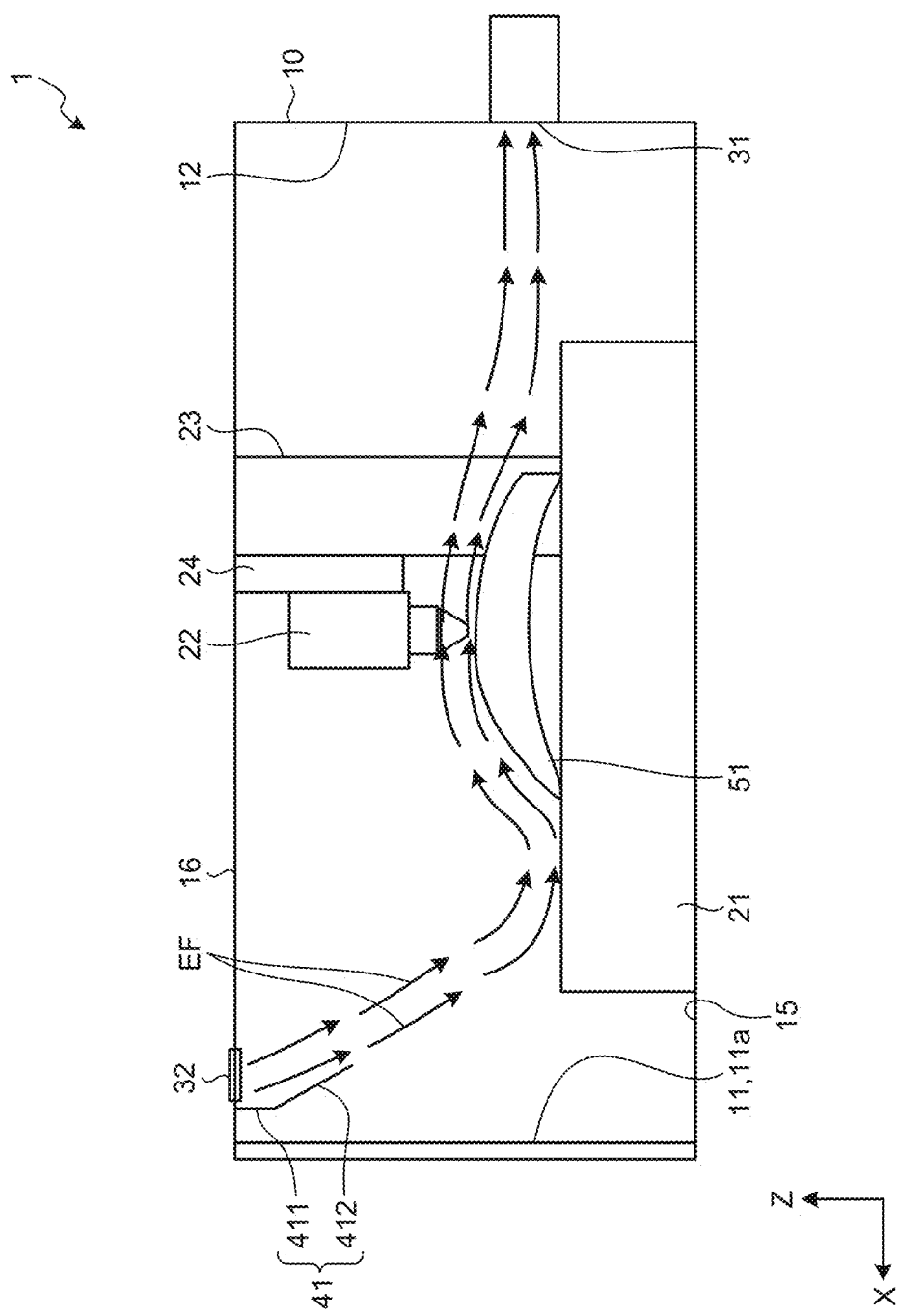
FIG. 8 is a cross-sectional view schematically illustrating movement of the gate in the laser machine according to the second embodiment.
Figure 9:
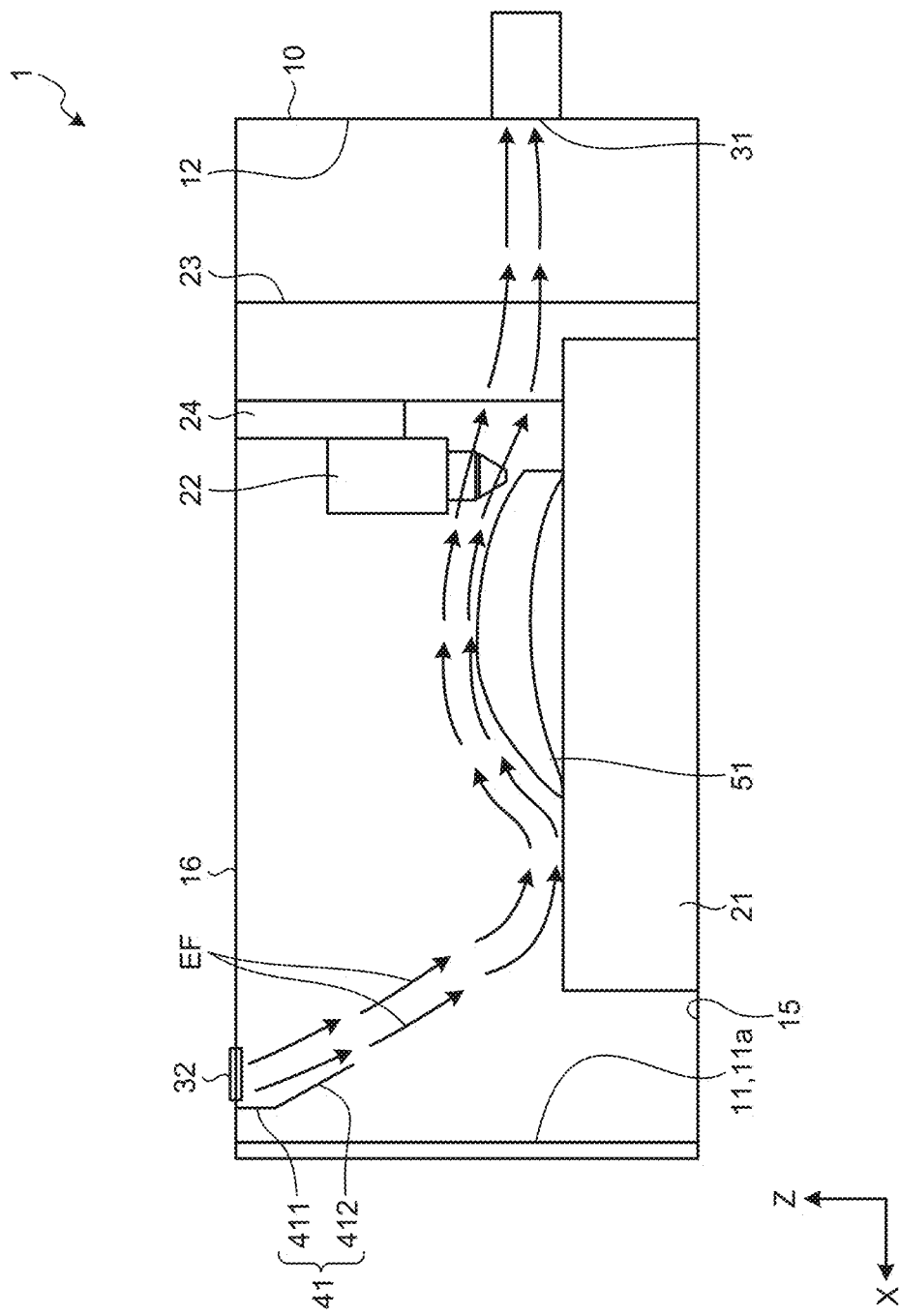
FIG. 9 is a cross-sectional view schematically illustrating movement of the gate in the laser machine according to the second embodiment.

FIGS. 8 and 9 are cross-sectional views schematically illustrating movement of the gate in the laser machine according to the second embodiment. As illustrated in FIGS. 7 to 9, even though the gate 23 moves to move the position of the machining head 22, the machining point at which the workpiece 51 is irradiated with laser light stays in the exhaust flow EF, so that dust generated at the machining point can be discharged at any position of machining.

In the second embodiment, the gate 23 is moved when machining is performed. In the case of moving the gate 23, it is not necessary to secure an extra space for moving the machining table 21 in the housing 10. Therefore, the length of the housing 10 of the laser machine 1 in the X-axis direction with respect to the machining table 21 can be reduced, or the length of the machining table 21 in the X-axis direction with respect to the housing 10 can be increased. As a result, it is possible to achieve the effect that the space utilization efficiency can be further improved, in addition to the effect of the first embodiment.

Third Embodiment

The first and second embodiments have described the case where the outside air intake port 32 is provided in the vicinity of the loading/unloading door 11a on the upper face 16 of the housing 10. The third embodiment describes a case where the outside air intake port 32 is provided on the front face 11 of the housing 10.

Figure 10:
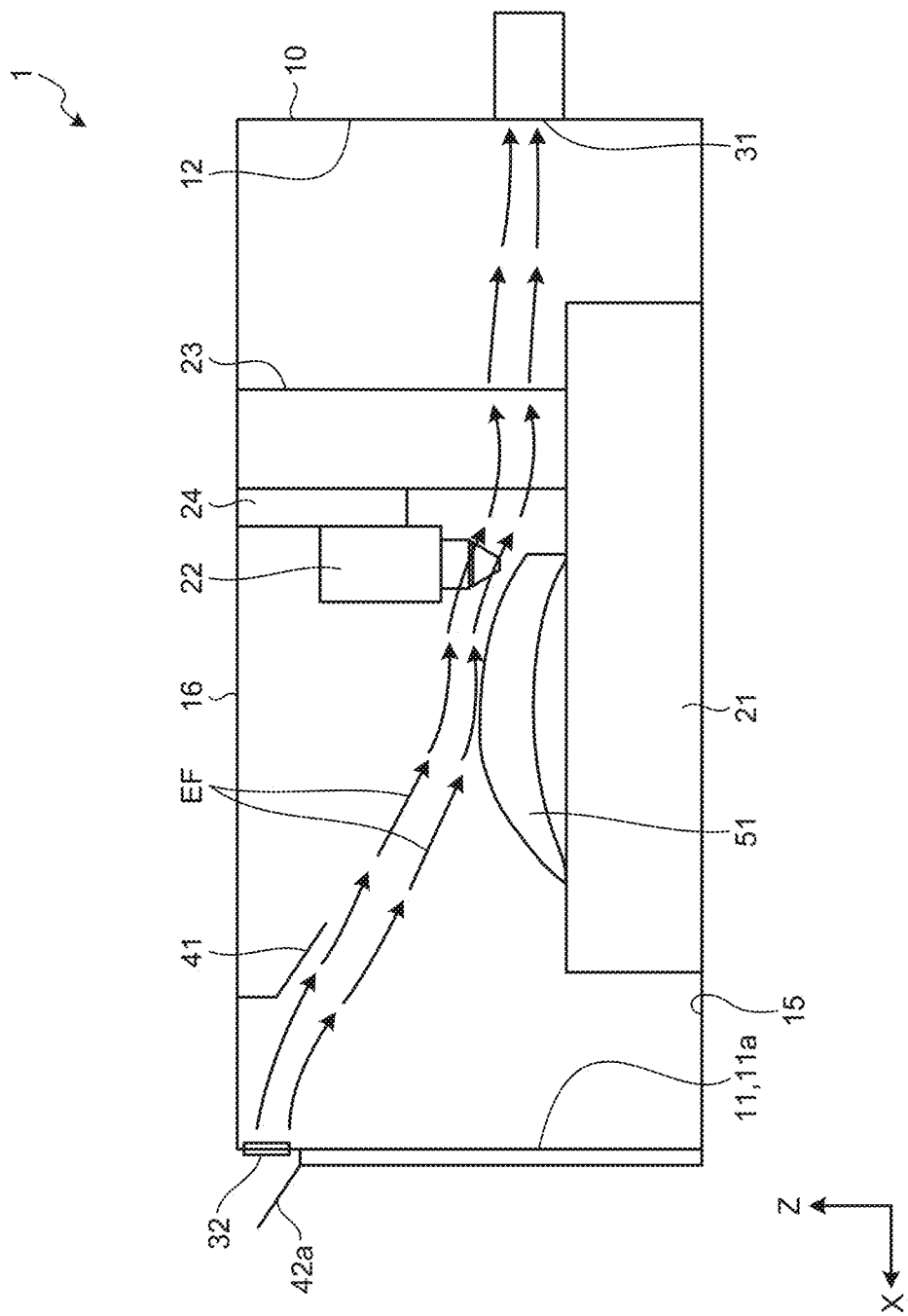
FIG. 10 is a cross-sectional view illustrating an exemplary configuration of a laser machine according to a third embodiment.

FIG. 10 is a cross-sectional view illustrating an exemplary configuration of the laser machine according to the third embodiment. In the case of the third embodiment, as illustrated in FIG. 10, the outside air intake port 32 is disposed on an upper side of the loading/unloading door 11a on the front face 11. In addition, the deflector 41 is installed on the upper face 16. Note that components identical to those in the first and second embodiments are denoted by the same reference signs, and the description thereof will be omitted.

Outside air is sucked to flow into the housing 10 from the outside air intake port 32. The exhaust flow EF, which is the flow of inflow outside air, goes along the upper face 16; however, as illustrated in FIG. 10, the exhaust flow EF can be guided to the machining point by the deflector 41 provided on the upper face 16 as in the cases of the first and second embodiments. As a result, dust generated at the machining point can be collected, and outside air containing dust can be discharged.

Note that a light shielding plate 42a as illustrated in FIG. 10 may be installed above the loading/unloading door 11a in order to shield reflected light, scattered light, or machining light coming from the machining point. The light shielding plate 42a is provided on the front face 11 at an angle inclined with respect to the front face 11 such that a projection of the light shielding plate 42a on the front face 11 includes the outside air intake port 32. Consequently, reflected light, scattered light, or machining light does not reach an operator outside the housing 10 via the upper face 16 of the housing 10. Reflected light, scattered light, or machining light could pass through the outside air intake port 32, in which case the light reaches an operator outside the housing 10 via the light shielding plate 42a and the ceiling at a higher position in the room where the laser machine 1 is disposed. Meanwhile, however, the reflected light, scattered light, or machining light is further scattered and attenuated. In the above-described case, the outside air intake port 32 is provided on an upper side of the loading/unloading door 11a, but the outside air intake port 32 may be provided on the loading/unloading door 11a. In one example, the outside air intake port 32 is formed in an upper part of the loading/unloading door 11a integrally with the loading/unloading door 11a.

The third embodiment can also adopt either the configuration in which the machining table 21 is moved or extended in the X-axis direction or the configuration in which the gate 23 having the machining head 22 is moved in the X-axis direction.

The third embodiment can achieve the same effects as the first and second embodiments.

Fourth Embodiment

The fourth embodiment describes a case where the ratio of the X-axis direction of the housing 10 to the height direction is larger than that in the first embodiment.

Figure 11:
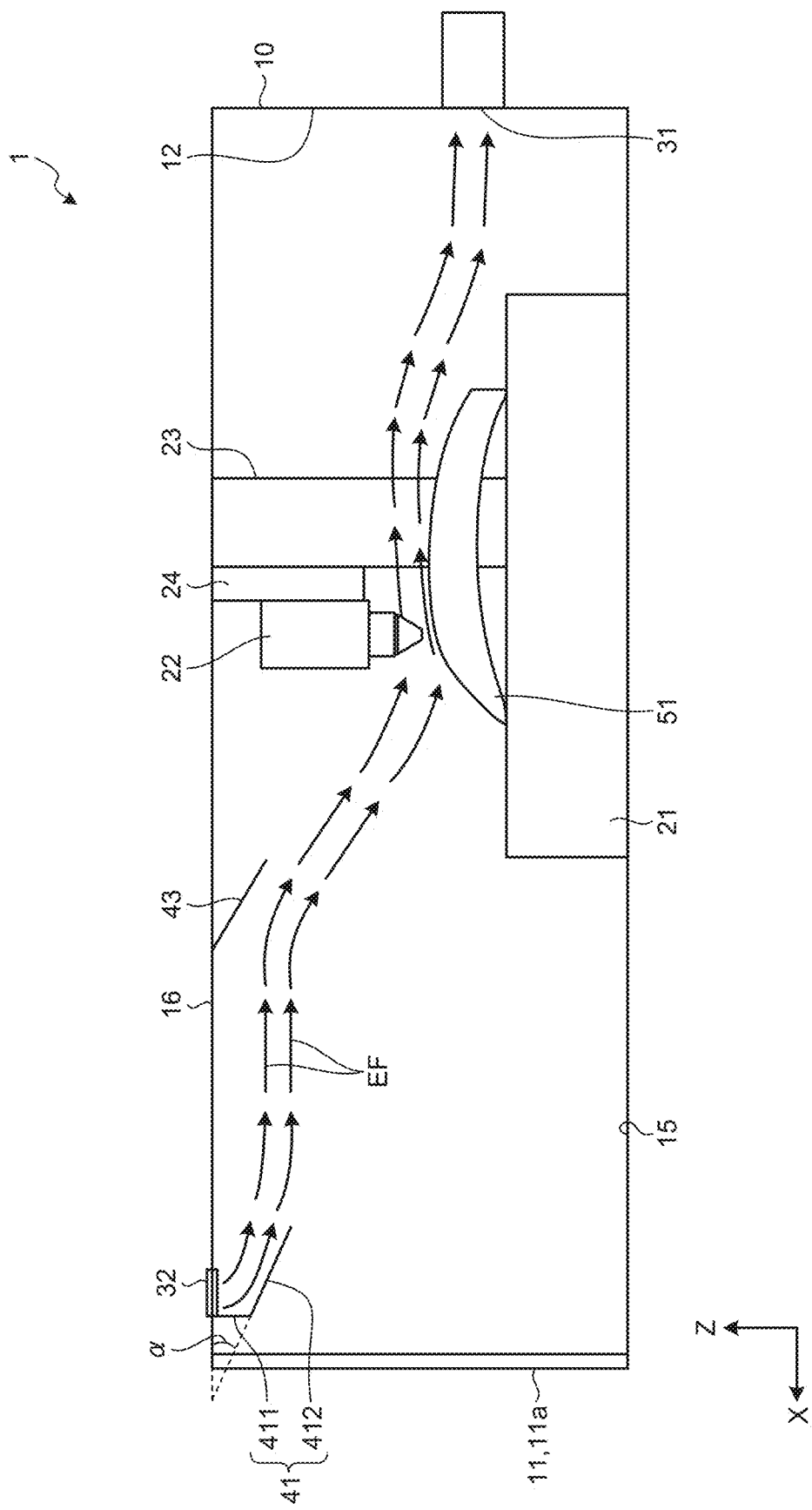
FIG. 11 is a cross-sectional view illustrating an exemplary configuration of a laser machine according to a fourth embodiment.

FIG. 11 is a cross-sectional view illustrating an exemplary configuration of the laser machine according to the fourth embodiment. Note that components identical to those in FIGS. 1 and 2 in the first embodiment are denoted by the same reference signs, and the description thereof will be omitted. As illustrated in FIG. 11, the ratio of the length of the housing 10 in the X-axis direction, which is the longitudinal direction, to the height in the Z-axis direction is larger than that in FIG. 2 depicted in the first embodiment. Given that the height of the housing 10 is the same in FIGS. 11 and 2, the fourth embodiment pertains to an aspect related to the laser machine 1 capable of machining the workpiece 51 with a longer shape. The laser machine 1 according to the fourth embodiment changes the relative position between the machining head 22 and the workpiece 51 by moving or extending the machining table 21 as in the first embodiment. For example, the value of the ratio of the length in the X-axis direction to the height in the Z-axis direction is about 2.2 in FIG. 2 in the first embodiment, whereas the value is about 3 in FIG. 11 in the fourth embodiment.

As illustrated in FIG. 11, because the length of the housing 10 in the X-axis direction is larger than that in the first embodiment, the distance between the machining head 22 fixed to the gate 23 and the loading/unloading door 11a is also larger. Accordingly, as compared with the first embodiment, the angle α of the deflector 41 is adjusted so as to be directed to the farther machining position. For example, the angle α formed by the upper face 16 and the second portion 412 of the deflector 41 is 25 degrees or less. In addition, the laser machine 1 according to the fourth embodiment further includes a restrictor 43, i.e. a member that changes the direction of the exhaust flow EF downward from the upper face 16 toward the machining point, between the upper face 16 and the beam 232 of the gate 23. The restrictor 43 includes a surface facing a space including the outside air intake port 32 and inclined with respect to the upper face 16. That is, the restrictor 43 includes an inclined surface on the side of the outside air intake port 32.

With such a configuration, outside air introduced into the housing 10 from the outside air intake port 32 flows to the exhaust port 31 after being supplied to the machining point at the tip of the machining head 22, whereby dust or the like can be discharged.

In FIG. 11, the restrictor 43 is configured by a flat plate provided at an angle with the upper face 16, but may include a curved surface at the connection with the upper face 16. Alternatively, the restrictor 43 may be configured by attaching a columnar member having one tapered surface to the upper face 16, or the restrictor 43 may be configured by forming a protrusion on the shape of the upper face 16. The width of the restrictor 43 in the Y-axis direction only needs to be larger than the width of the machining table 21. The width of the restrictor 43 in the Y-axis direction is preferably 10% larger than the width of the machining table 21. Further, the width of the restrictor 43 in the Y-axis direction is preferably the length between the left face 13 and the right face 14 of the housing 10 in the Y-axis direction. By sufficiently increasing the width of the restrictor 43 in this manner, all the flows can be guided in the direction toward the machining point.

Figure 12:
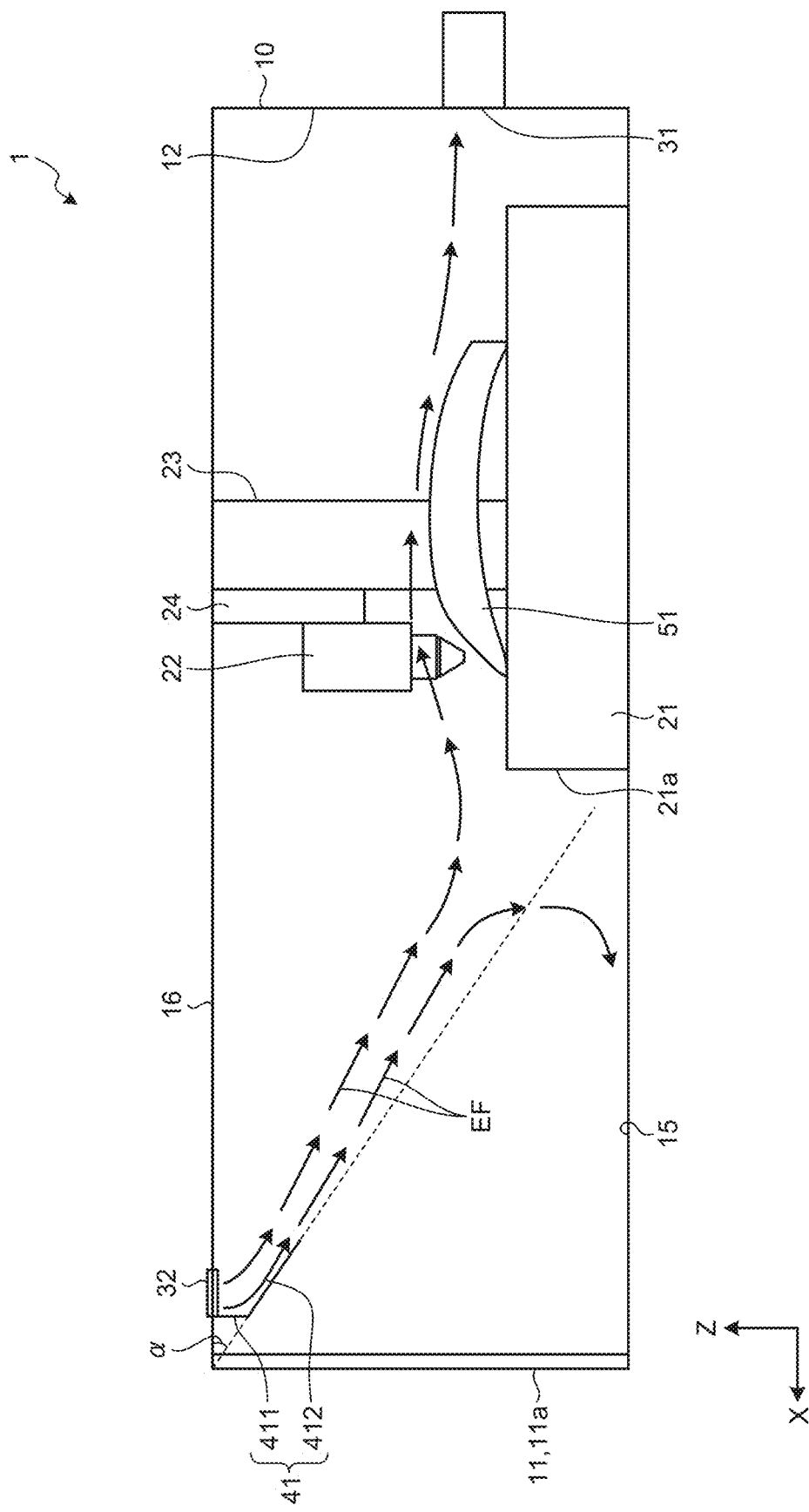
FIG. 12 is a diagram illustrating an example of exhaust flow inside the housing of the laser machine without a restrictor.

Next, the functions of the deflector 41 and the restrictor 43 in the configuration of the laser machine 1 according to the fourth embodiment will be described. FIG. 12 is a diagram illustrating an example of exhaust flow inside the housing of the laser machine without a restrictor. In the laser machine 1 of FIG. 12, the length of the housing 10 in the X-axis direction is the same as that in FIG. 11, but the angle α of the deflector 41 is equal to that described in the first embodiment. That is, the angle α between the second portion 412 of the deflector 41 and the upper face 16 of the housing 10 is 25 to 50 degrees. FIG. 12 illustrates a case where the machining table 21 is disposed on the rear side in order to machine the front face of the workpiece 51. The dotted line in the drawing is an extension of the slope of the second portion 412 of the deflector 41. Note that components identical to those in FIGS. 1 and 2 in the first embodiment are denoted by the same reference signs, and the description thereof will be omitted.

With the machining table 21 disposed at this position, the exhaust flow EF formed by the outside air sucked from the outside air intake port 32 collides with the end surface 21*a* of the machining table 21 facing the loading/unloading door 11*a*, and a part thereof is returned toward the loading/unloading door 11*a*, so that the sufficient exhaust flow EF cannot be supplied to the machining point. That is, the angle of the deflector 41 is insufficient, and thus the angle α of the deflector 41 needs to be directed in the direction toward the farther machining head 22.

Figure 13:
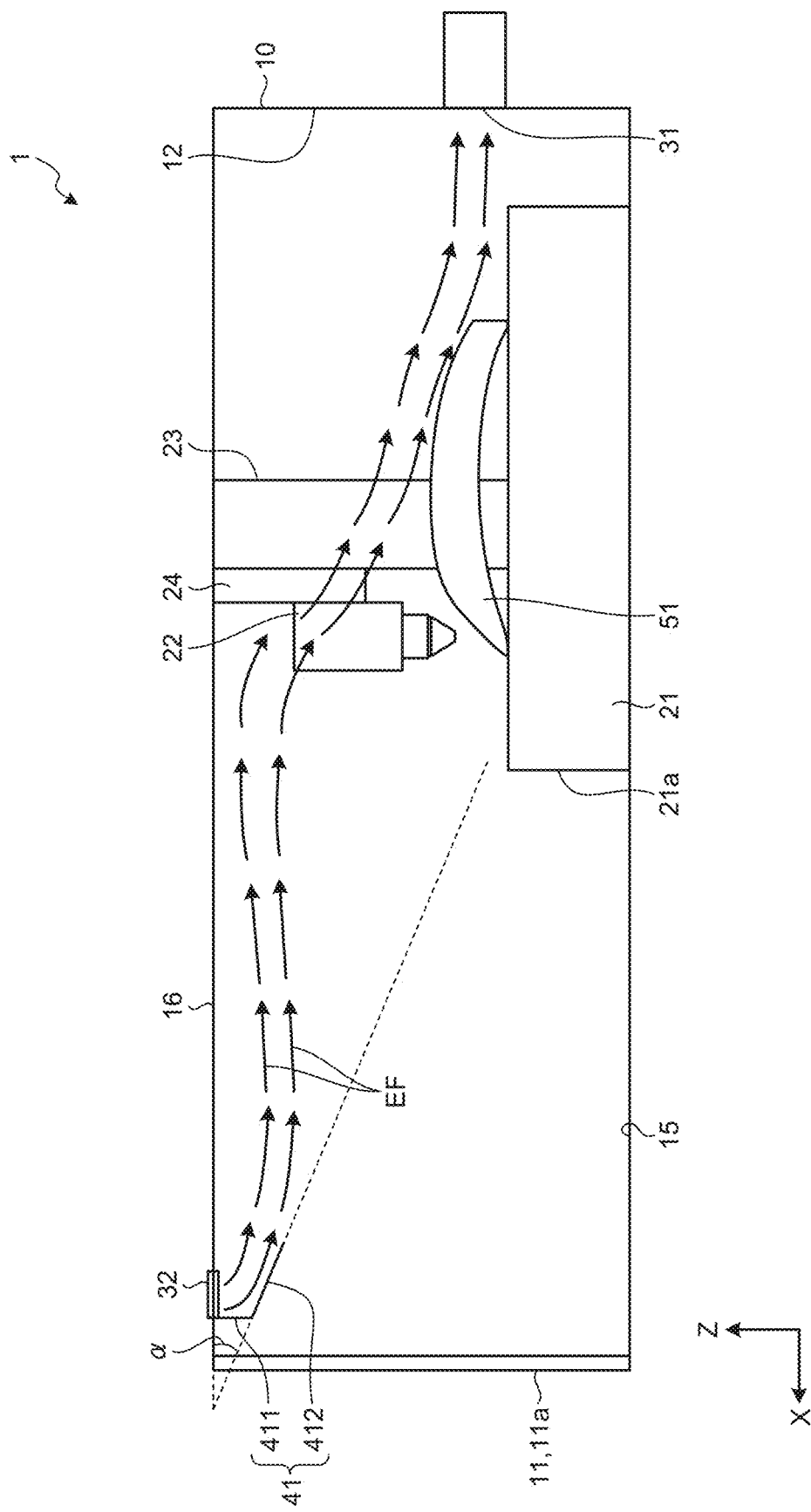
FIG. 13 is a diagram illustrating another example of exhaust flow inside the housing of the laser machine without a restrictor.

FIG. 13 is a diagram illustrating another example of exhaust flow inside the housing of the laser machine without a restrictor. Similarly to FIG. 12, FIG. 13 is a diagram illustrating an example of the exhaust flow EF inside the housing 10 of the laser machine 1 without the restrictor 43. In the laser machine 1 of FIG. 13, the length of the housing 10 in the X-axis direction is the same as that in FIG. 11. The angle α is adjusted such that the slope of the second portion 412 of the deflector 41, that is, an extension line of the second portion 412, comes closer to the machining point. Note that components identical to those in FIGS. 1 and 2 in the first embodiment are denoted by the same reference signs, and the description thereof will be omitted.

As illustrated in FIG. 13, adjusting the angle α such that the position on the extension line of the slope of the second portion 412 of the deflector 41 comes closer to the machining point makes the distance between the exhaust flow EF and the upper face 16 shorter and makes the angle between the direction of the exhaust flow EF and the upper face 16 nearly parallel, that is, 20 degrees or less. Therefore, as the exhaust flow EF goes downstream, the exhaust flow EF is drawn to the upper face 16 to go along the upper face 16 due to the Coandă effect to be described later. As a result, as illustrated in FIG. 13, the exhaust flow EF passes above the machining point and goes under the gate 23, and dust or the like generated at the machining point cannot be discharged.

As described in Japanese Translation of PCT International Application Laid-open No. 2007-505283, the Coandă effect is the phenomenon discovered in an aeronautical experiment conducted by Romanian engineer Henri Coandă in 1910. The Coandă effect is the property that an air jet that is placed sufficiently close to a surface such as a ceiling is attracted to the surface and keeps flowing in contact with the surface. The Coandă effect is also called the surface effect. This phenomenon is derived from the property of an air jet to be attracted into the ambient air in contact and mixed, i.e. diffused, with the ambient air. No ambient air can be attracted into a surface, no matter how close to the surface it is. This results in a reduction in the pressure between the flow of air and the surface, making the air jet liable to be attracted to the surface.

On the other hand, as illustrated in FIG. 11, in the configuration of the laser machine 1 according to the fourth embodiment, in which the restrictor 43 is disposed between the deflector 41 on the upper face 16 and the machining head 22 inside the housing 10, the exhaust flow EF is deflected by the deflector 41 and then drawn to the upper face 16 to flow along the upper face 16. Thereafter, the exhaust flow EF is bent again along the restrictor 43. Consequently, the exhaust flow EF is separated from the upper face 16, so that the exhaust flow EF can be guided to the machining point. Therefore, even in the housing 10 having the present configuration, that is, having a shape extending in the moving direction of the machining table 21, the exhaust flow EF from the outside air intake port 32 provided on the upper face 16 in the vicinity of the loading/unloading door 11*a* is guided to the machining point, whereby dust or the like generated at the machining point can be sent to the exhaust port 31 and collected.

The laser machine 1 according to the fourth embodiment includes the restrictor 43 between the deflector 41 on the upper face 16 inside the housing 10 extending in the moving direction of the machining table 21 and the machining head 22. Consequently, the outside air flowing into the housing 10 from the outside air intake port 32 flows along the upper face 16, but is directed toward the machining point by the restrictor 43. Consequently, the exhaust flow EF is also guided to the machining point inside the housing 10 extending in the moving direction of the machining table 21, and the same effect as the first embodiment can be achieved.

Fifth Embodiment

In the fourth embodiment, the restrictor 43 inside the housing 10 extending in the moving direction of the machining table 21 is disposed on the upper face 16 at an angle that is not perpendicular to the upper face 16 of the housing 10. The fifth embodiment describes the laser machine 1 capable of guiding the exhaust flow EF to the machining point inside the housing 10 extending in the moving direction of the machining table 21 in a manner different from that in the fourth embodiment.

Figure 14:
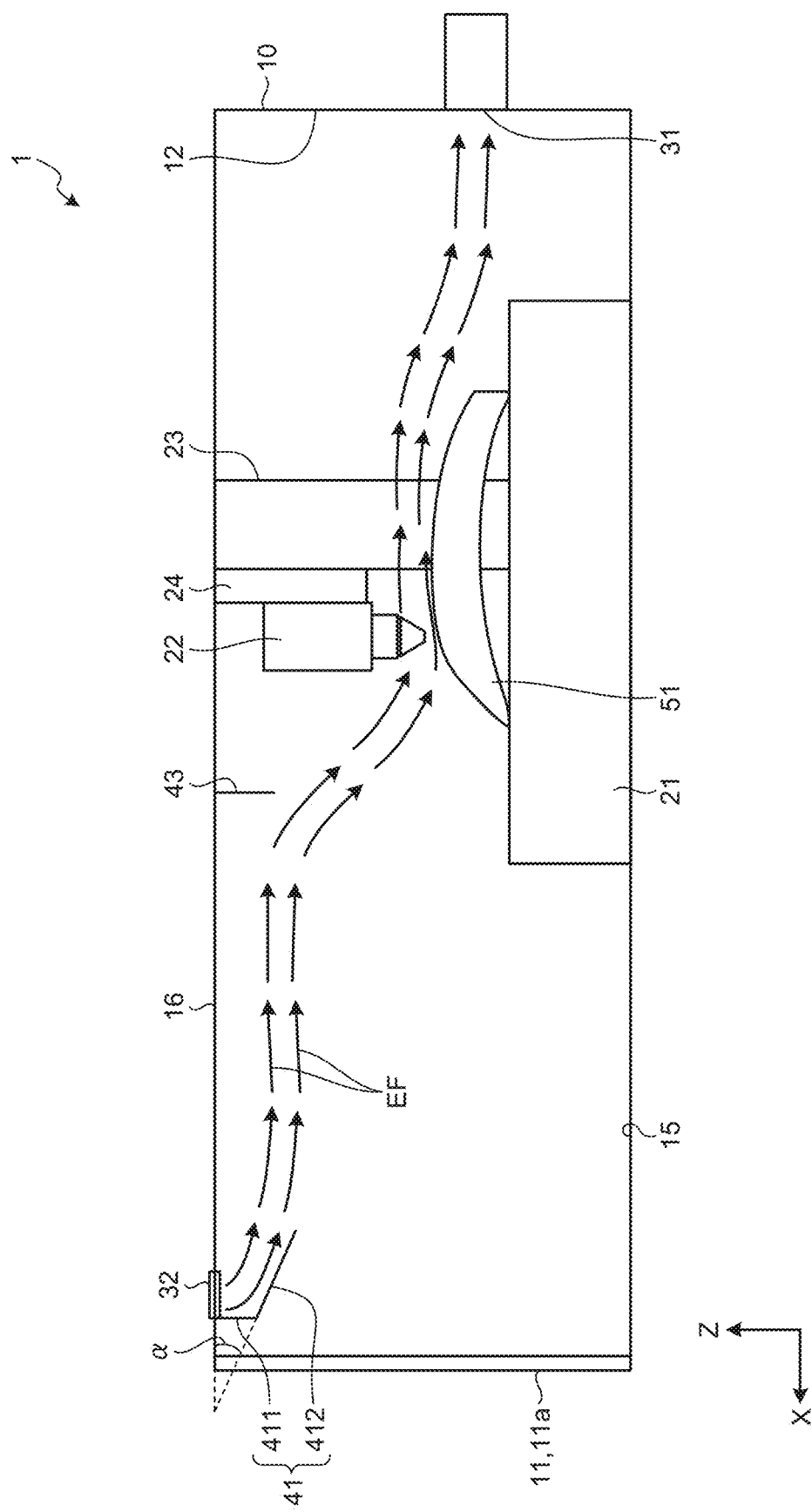
FIG. 14 is a cross-sectional view illustrating an exemplary configuration of a laser machine according to a fifth embodiment.

FIG. 14 is a cross-sectional view illustrating an exemplary configuration of the laser machine according to the fifth embodiment. In the fourth embodiment, as illustrated in FIG. 11, the restrictor 43 has a shape including an inclined surface on the side of the outside air intake port 32 with respect to the upper face 16 of the housing 10. In the fifth embodiment, as illustrated in FIG. 14, the restrictor 43 includes a plane perpendicular to the upper face 16. Note that components identical to those in FIGS. 1 and 2 in the first embodiment are denoted by the same reference signs, and the description thereof will be omitted.

The exhaust flow inside the housing 10 of the laser machine 1 according to the fifth embodiment will be described. Similarly to the fourth embodiment, the outside air flowing in from the outside air intake port 32 is directed by the deflector 41 toward the gate 23 to which the machining head 22 is fixed. However, this flow, which is close to the upper face 16 and nearly parallel to the upper face 16, is drawn to the upper face 16 due to the Coandă effect, and then collides with the restrictor 43, thereby being bent downward and guided to the machining point. Therefore, even in the case where the restrictor 43 is provided perpendicular to the upper face 16, dust or the like generated at the machining point can be sent to the exhaust port 31 and collected.

In FIG. 11 in the fourth embodiment, the exhaust flow EF along the upper face 16 is bent at a gentle angle by the restrictor 43. In contrast, in the fifth embodiment, because the restrictor 43 is disposed with a plane orthogonal to the exhaust flow EF, the exhaust flow EF collides with the restrictor 43, and a stagnation region is formed on the surface of the restrictor 43. Thereafter, the exhaust flow EF flows by avoiding the stagnation region, and thus is directed downward without following the restrictor 43. As a result, as illustrated in FIG. 14, the direction of the exhaust flow EF is bent by the restrictor 43 at a steeper angle than in the case of the fourth embodiment.

Figure 15:
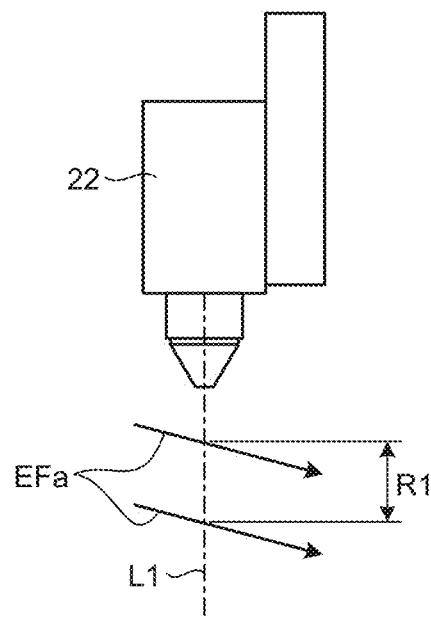
FIG. 15 is a diagram illustrating an example way of exhaust flow around the machining head in the laser machine according to the fourth embodiment.

The exhaust flow EF in the vicinity of the machining head 22 in such situations will be described. FIG. 15 is a diagram illustrating an example way of exhaust flow around the machining head in the laser machine according to the fourth embodiment. In the drawing, two single arrows EFa indicate locations with a flow rate, e.g. 0.4 m/s, at which dust can be sufficiently collected. The range between these single arrows EFa indicates where the flow rate is 0.4 m/sec or more and dust can be properly collected. In the drawing, the region between the intersections between the respective single arrows EFa and the straight line L1 passing through the center of the machining head 22 indicated by the alternate long and short dash line represents the vertical range R1 in which the flow can properly collect dust in the machining region.

Figure 16:
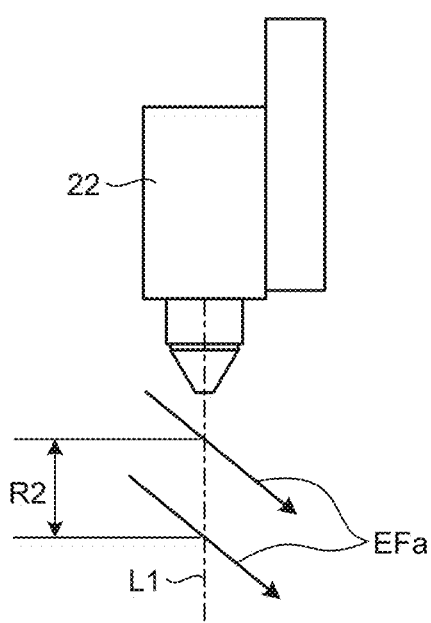
FIG. 16 is a diagram illustrating an example way of exhaust flow around the machining head in the laser machine according to the fifth embodiment.

FIG. 16 is a diagram illustrating an example way of exhaust flow around the machining head in the laser machine according to the fifth embodiment. The two single arrows EFa in the drawing are similar to those described with reference to FIG. 15. As illustrated in FIG. 16, the flow around the machining head 22 of the laser machine 1 according to the fifth embodiment comes from above at a larger angle with respect to the machining head 22. Therefore, given that the distance between the single arrows EFa is the same, the vertical range R2 in which the exhaust flow EF can properly collect dust is wider than the range R1 in the case of FIG. 15. Thus, the configuration of the laser machine 1 according to the fifth embodiment allows dust to be properly collected and discharged in the machining region with a wider vertical range.

As compared with the fourth embodiment, in the fifth embodiment, the flow angle with respect to the machining point is steep, and thus the position of the restrictor 43 in the X-axis direction with respect to the machining head 22 is closer to the machining head 22. If the position of the restrictor 43 in the X-axis direction is too close to the machining head 22, the exhaust flow EF passes above the machining region. If the position of the restrictor 43 in the X-axis direction is too far from the machining head 22, the flow reaches the surface of the machining table 21 before the machining head 22, so that the flow concentrates below the machining region. As a result, the above-described advantage that the machining region that can be covered is widened in the vertical direction cannot be obtained. Therefore, the restrictor 43 has a preferable horizontal position that depends on the desired vertical range of the machining region.

Figure 17:
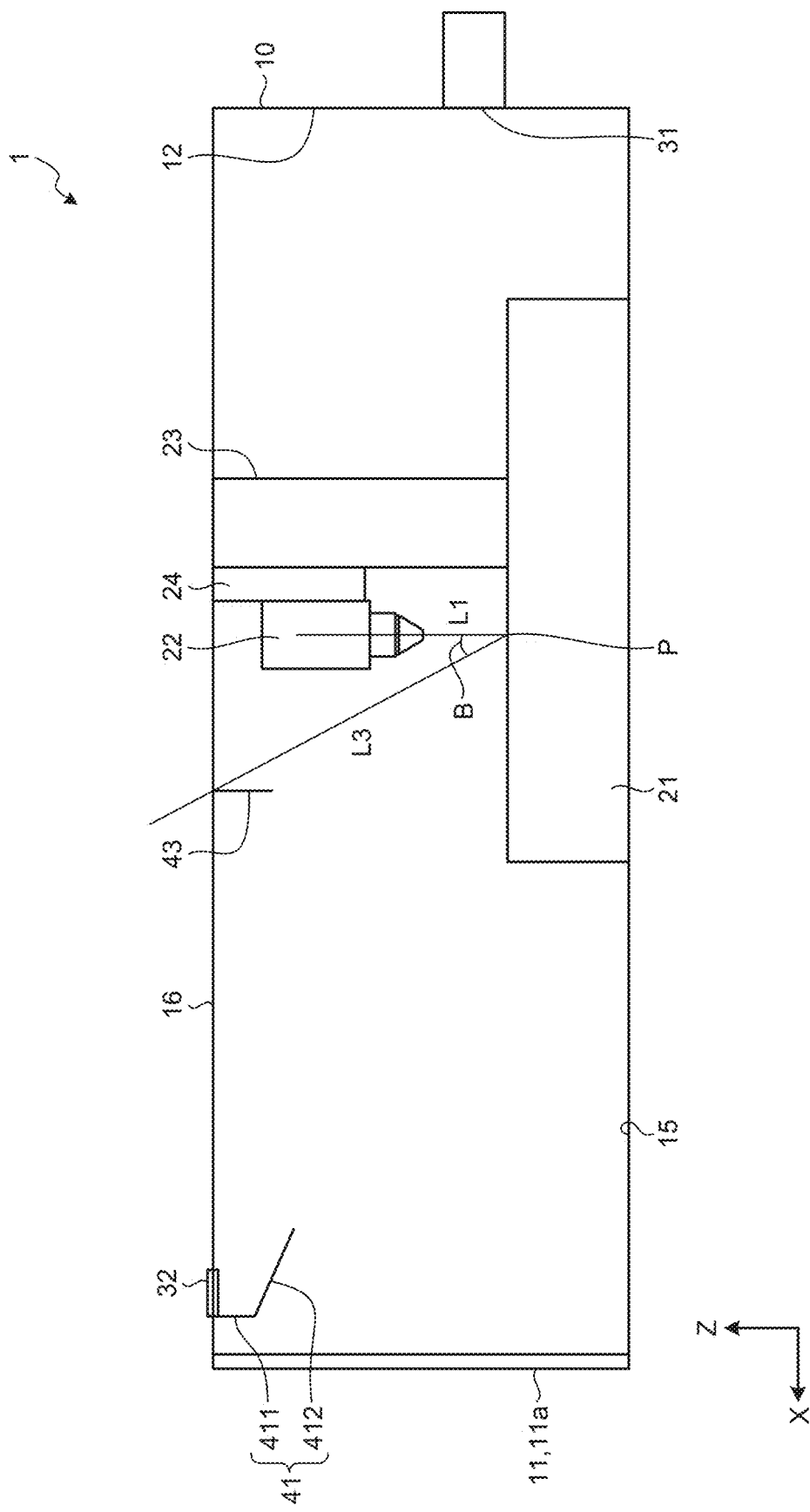
FIG. 17 is a cross-sectional view illustrating an example of the location of the restrictor in the laser machine according to the fifth embodiment.

The result of the numerical fluid analysis on the position of the restrictor 43 in the X-axis direction will be described. FIG. 17 is a cross-sectional view illustrating an example of the location of the restrictor in the laser machine according to the fifth embodiment. This result shows that in order to form a flow from the loading/unloading door 11a through the machining point to the exhaust port 31, as illustrated in FIG. 17, the angle B formed by the straight line L3 connecting the installation position of the restrictor 43 on the upper face 16 with the point P where the straight line L1 drawn downward from the center of the machining head 22 intersects the machining table 21 is preferably 20 to 55 degrees. It is more preferable that the restrictor 43 be installed where the angle B is 30 to 45 degrees. By installing the restrictor 43 within such an angle range, it is possible to form a unidirectional flow from the loading/unloading door 11a to the exhaust port 31 in the housing 10 while increasing the vertical margin with respect to the machining point, and thus to efficiently collect dust or the like generated at the machining point.

In the laser machine 1 according to the fifth embodiment, the restrictor 43 perpendicular to the upper face 16 is provided between the deflector 41 on the upper face 16 inside the housing 10 extending in the moving direction of the machining table 21 and the machining head 22. Consequently, the outside air flowing into the housing 10 from the outside air intake port 32 flows along the upper face 16, but is directed toward the machining point by the restrictor 43. Consequently, the exhaust flow EF is also guided to the machining point inside the housing 10 extending in the moving direction of the machining table 21, and the same effect as the first embodiment can be achieved. In addition, as compared with the case where the restrictor 43 is provided at an angle that is not perpendicular to the upper face 16 as in the fourth embodiment, airflow can be supplied to a wider machining range in the vertical direction.

Although the first to fifth embodiments have described the case where the openable and closable loading/unloading door 11a is installed on the front face 11 of the housing 10, the openable and closable loading/unloading door 11a may be provided on a face other the front face 11. In addition, although the first to fifth embodiments have described the case where the housing has a hollow hexahedral shape, the lower face 15 may be configured by the floor surface in the room where the housing 10 of the laser machine 1 is provided. Furthermore, although the first to fifth embodiments have described the example in which the gate 23 is of the double-supported type in which the beam 232 supporting the machining head 22 is supported by the two pillars 231, the gate 23 may be of the cantilever type in which the beam 232 is supported by one pillar 231.

The configurations described in the above-mentioned embodiments indicate examples. The embodiments can be combined with another well-known technique and with each other, and some of the configurations can be omitted or changed in a range not departing from the gist.

REFERENCE SIGNS LIST 1 laser machine; 10 housing; 11 front face; 11a loading/unloading door; 12 rear face; 13 left face; 14 right face; 15 lower face; 16 upper face; 21 machining table; 21a end surface; 22 machining head; 23 gate; 24 support member; 31 exhaust port; 32 outside air intake port; 41 deflector; 42, 42a light shielding plate; 43 restrictor; 51 workpiece; 231 pillar; 232 beam; 411 first portion; 412 second portion.

The invention claimed is:

1. A laser machine comprising:
a housing disposed on a floor surface in a room, and including a first face and a second face orthogonal to a first direction, a third face and a fourth face orthogonal to a second direction, and a fifth face orthogonal to a third direction and facing the floor face, the first direction, the second direction, and the third direction being three directions orthogonal to each other;
a machining table disposed inside the housing, and including a table face on which a workpiece is placed and that is parallel to the floor surface;
a gate including a pillar provided on at least one of opposite sides of the machining table in the second direction, and a beam connected to the pillar and extending in the second direction above the machining table;
a machining head supported by the beam and adapted to emit laser light;
a loading/unloading door, being openable and closable, for use in loading/unloading the workpiece;
an exhaust port provided on the second face and connected to an exhaust unit that generates an airflow that is a flow of air inside the housing;
an outside air intake port provided in an upper part of the housing between the first face and the machining head in the first direction, and adapted to take in outside air that is air outside the housing; and
a deflector adapted to guide the outside air introduced through the outside air intake port toward the machining head, wherein
the machining head is disposed between the second face and the outside air intake port at all positions in a range of movement.

2. The laser machine according to claim 1, wherein the deflector is provided on the fifth face inside the housing.

3. The laser machine according to claim 1, wherein the deflector is formed by a plurality of members extending in the second direction and arranged parallel to each other in the first direction in a region including the outside air intake port on the fifth face inside the housing.

4. The laser machine according to claim 1, wherein the deflector is provided on the outside air intake port outside the housing.

5. The laser machine according to claim 2, wherein the outside air intake port is provided on the fifth face.

6. The laser machine according to claim 2, wherein the outside air intake port is disposed on an upper side of the loading/unloading door on the first face.

7. The laser machine according to claim 2, further comprising
a restrictor on the fifth face inside the housing between the outside air intake port and the beam, the restrictor being adapted to change a direction of the airflow toward the machining head.

8. The laser machine according to claim 7, wherein the restrictor includes a surface facing a space including the outside air intake port and inclined with respect to the fifth face.

9. The laser machine according to claim 7, wherein the restrictor is a plate-shaped member extending in the second direction and perpendicular to the fifth face.

10. The laser machine according to claim 1, wherein either the machining table or the machining head is movable in the first direction.

11. The laser machine according to claim 1, further comprising
a light shielding plate adapted to prevent reflected light or scattered light of the laser light or machining light from the workpiece from leaking from the outside air intake port, wherein
the light shielding plate is provided on at least a part of a periphery of the outside air intake port outside the housing.

12. The laser machine according to claim 3, wherein the outside air intake port is provided on the fifth face.

13. The laser machine according to claim 4, wherein the outside air intake port is provided on the fifth face.

* * * * *